US012769034B2

(12) United States Patent
Suzuki et al.

(10) Patent No.: US 12,769,034 B2
(45) Date of Patent: Oct. 20, 2026

(54) PLASTIC LENS FOR SPECTACLES

(71) Applicant: TOKAI OPTICAL CO. LTD., Okazaki (JP)

(72) Inventors: Ryosuke Suzuki, Okazaki (JP); Hirotoshi Takahashi, Okazaki (JP)

(73) Assignee: TOKAI OPTICAL CO. LTD., Okazaki (JP)

( * ) Notice: Subject to any disclaimer, the term of this patent is extended or adjusted under 35 U.S.C. 154(b) by 313 days.

(21) Appl. No.: 18/474,380

(22) Filed: Sep. 26, 2023

(65) Prior Publication Data

US 2024/0019608 A1 Jan. 18, 2024

Related U.S. Application Data

(63) Continuation of application No. PCT/JP2022/013228, filed on Mar. 22, 2022.

(30) Foreign Application Priority Data

Mar. 29, 2021 (JP) ................................ 2021-055875

(51) Int. Cl.

| | |
|---|---|
| ***G02B 1/18*** | (2015.01) |
| ***G02B 1/04*** | (2006.01) |
| ***G02B 1/11*** | (2015.01) |

(52) U.S. Cl.

CPC ............... *G02B 1/18* (2015.01); *G02B 1/041* (2013.01); *G02B 1/11* (2013.01)

(58) Field of Classification Search

CPC ............. G02B 1/18; G02B 1/041; G02B 1/11

See application file for complete search history.

(56) References Cited

U.S. PATENT DOCUMENTS

2021/0325693 A1 10/2021 Nomura

FOREIGN PATENT DOCUMENTS

| | | |
|---|---|---|
| JP | 2016-033109 A | 3/2016 |
| JP | 2018-012877 A | 1/2018 |
| JP | 2018-159860 A | 10/2018 |
| JP | 2020-142494 A | 9/2020 |
| WO | 2020/138469 A1 | 7/2020 |

OTHER PUBLICATIONS

JP 2020106751 A (Nomura Takumi) machine translation (Year: 2020).*

(Continued)

*Primary Examiner* — James A Dudek

(74) *Attorney, Agent, or Firm* — Muncy, Geissler, Olds & Lowe, P.C.

(57) ABSTRACT

Provided is a plastic lens, for spectacles, which inhibits occurrence of abnormal outer appearance and has antibacterial property.

A plastic lens 1 for spectacles includes: a plastic base 2; and a dielectric multilayer film 4 formed on a film formation surface M of the base 2. The dielectric multilayer film 4 includes one or more low refractive index dielectric layers 6, one or more high refractive index dielectric layers 8, and an antibacterial layer 10. The antibacterial layer 10 is a dielectric layer containing metal ion-carrying zeolite, and is disposed closer to an air side than all of the low refractive index dielectric layers 6 and all of the high refractive index dielectric layers 8 are. A physical film thickness of the antibacterial layer 10 is less than 50 nm.

6 Claims, 11 Drawing Sheets

(56) References Cited

OTHER PUBLICATIONS

JP 2016033109 A (Suwa Kumiko) machine translation (Year: 2016).*
International Search Report and Written Opinion dated Jun. 14, 2022 (Application No. PCT/JP2022/013228).
Extended European Search Report dated Jan. 10, 2025 (Application No. 22780329.3).
Japanese Office Action for Japanese Application No. 2023-511029 dated Apr. 7, 2026.

* cited by examiner

PLASTIC LENS FOR SPECTACLES

CROSS REFERENCE TO RELATED APPLICATION

This application is a Continuation of International Application No. PCT/JP2022/013228, filed on Mar. 22, 2022, which claims the benefit of Japanese Patent Application Number 2021-055875 filed on Mar. 29, 2021, the disclosures of which are incorporated by reference herein in their entireties.

FIELD OF THE INVENTION

The present invention relates to an antibacterial plastic lens for spectacles.

BACKGROUND OF THE INVENTION

As an antibacterial optical product, a product disclosed in JP 2018-159860 A has been known.

In this optical product, a dielectric layer containing metal ion-carrying zeolite is disposed as an outermost layer of a dielectric multilayer film on a surface of a base.

An antibacterial property is imparted to the optical product. However, in a case where the optical product is used as it is for a plastic lens for spectacles, abnormal outer appearance may be caused depending on cases.

Therefore, a main object of the present disclosure is to provide an antibacterial plastic lens, for spectacles, which inhibits occurrence of abnormal outer appearance.

SUMMARY OF THE INVENTION

The present specification discloses a plastic lens for spectacles. The plastic lens for spectacles includes: a plastic base; and a dielectric multilayer film formed directly or indirectly on a film formation surface of the base. The dielectric multilayer film includes one or more low refractive index dielectric layers, one or more high refractive index dielectric lavers, and an antibacterial layer. The antibacterial layer is a dielectric layer containing metal ion-carrying zeolite. The antibacterial layer is disposed closer to an air side than all of the low refractive index dielectric layers and all of the high refractive index dielectric layers are. The antibacterial layer has a physical film thickness of less than 50 nm.

A main effect of the present disclosure is to provide the plastic lens, for spectacles, which inhibits occurrence of abnormal outer appearance and has an antibacterial property.

DETAILED DESCRIPTION OF THE INVENTION

An exemplary embodiment of the present disclosure will be described below with appropriate reference to the drawings.

However, the embodiment is not limited to the following exemplary embodiment.

Figure 1:
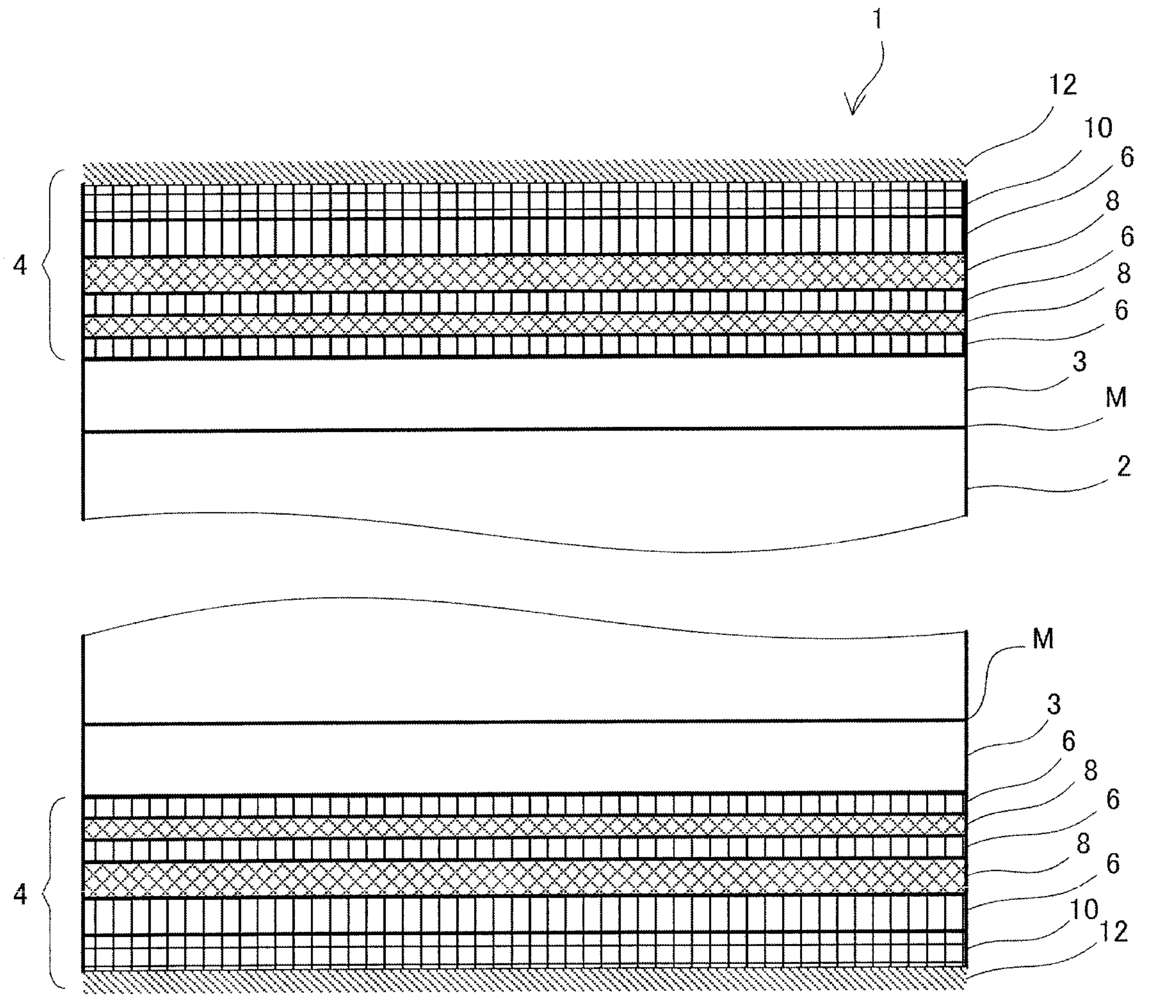
FIG. 1 is a schematic cross-sectional view of a plastic lens for spectacles according to the present disclosure.
Figure 2:
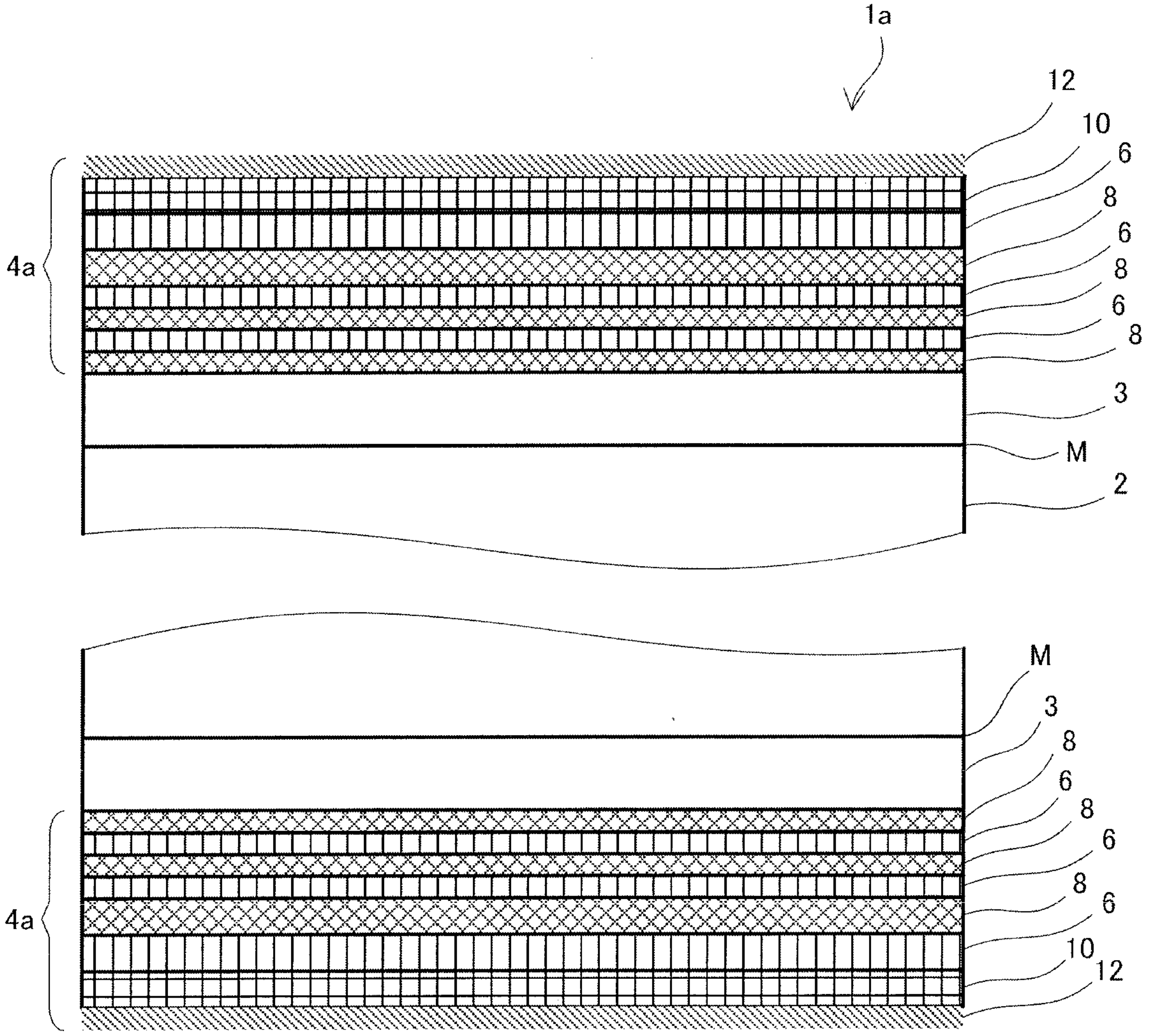
FIG. 2 is a schematic cross-sectional view of another plastic lens for spectacles according to the present disclosure.

FIG. 1 is a schematic cross-sectional view of a plastic lens for spectacles according to the present disclosure. FIG. 2 is a schematic cross-sectional view of another plastic lens for spectacles according to the present disclosure.

A plastic lens 1 shown in FIG. 1 for spectacles according to the present disclosure has a base 2, two of intermediate films 3, and two of dielectric multilayer films 4. A plastic lens 1*a* shown in FIG. 2 for spectacles according to the present disclosure has a base 2, two of intermediate films 3, and two of dielectric multilayer films 4*a*.

The plastic lens 1*a* for spectacles has the same configuration as the plastic lens 1 for spectacles except for the configuration of the dielectric multilayer film 4*a*. Components of the plastic lens 1*a*, for spectacles, which are the same as components of the plastic lens 1 for spectacles are denoted as appropriate by the same reference characters as for the plastic lens 1 for spectacles, and the description thereof is omitted. Further, the plastic lens 1 and 1*a* may have three or more intermediate films 3 and dielectric multilayer films 4, respectively.

The base 2 is translucent. The base 2 is a base of a plastic lens for spectacles.

As a material of the base 2, thermosetting resin is preferably used. Examples of the thermosetting resin include polyurethane resin, thiourethane resin, urethane-urea resin, episulfide resin, polycarbonate resin, polyester resin, acrylic resin, polyether sulfone resin, poly(4-methylpentene-1) resin, diethylene glycol bis(allyl carbonate) resin, and a combination thereof.

The dielectric multilayer films 4 are disposed on both surfaces of the base 2. That is, the dielectric multilayer films 4 are disposed on a front surface (objective side) and a rear surface (human body side), respectively, of the base 2 that is the base of the plastic lens for spectacles. In other words, the dielectric multilayer films 4 are disposed on two film formation surfaces M, respectively, of the base 2. The dielectric multilayer films 4 on the respective surfaces of the base 2 have the same configuration. Unless otherwise specified, the dielectric multilayer film 4 on one surface will be described below. The dielectric multilayer films 4 may have different configurations. The dielectric multilayer film 4 may be disposed merely on one surface.

Each dielectric multilayer film 4 is disposed via the intermediate film 3. Each intermediate film 3 is a hard coating film. At least one of the dielectric multilayer films 4 may be formed directly on the film formation surface M or may be formed via another kind of the intermediate film 3 instead of the hard coating film or in addition to the hard coating film. Different kinds of the intermediate films 3 may be provided on the respective surfaces of the base 2, or the intermediate film 3 may be present on one surface of the base 2 and absent on the other surface thereof.

The dielectric multilayer film 4*a* is disposed on the base 2 (intermediate film 3) in the same manner as for the dielectric multilayer film 4.

The hard coating film is suitably formed by uniformly applying a hard coating solution to the surface of the base 2.

As a material of the hard coating film, an organosiloxane-based resin containing inorganic oxide particles may be preferably used. In this case, the hard coating solution is preferably prepared by dispersing (mixing) a solute containing organosiloxane-based resin and inorganic oxide particle sol as main components, in water or an alcohol-based solvent. An organosiloxane-based resin obtained by hydrolyzing and condensing an alkoxysilane is preferred as the organosiloxane-based resin. Specific examples of the organosiloxane-based resin include γ-glycidoxypropyltrimethoxysilane, γ-glycidoxypropyltriethoxysilane, methyl trimethoxysilane, ethyl silicate, and a combination thereof. The hydrolysis condensates of the alkoxysilanes are produced by hydrolyzing an alkoxysilane compound or a combination of the compounds, with an acidic aqueous solution such as hydrochloric acid.

Meanwhile, specific examples of a material of the inorganic oxide particles include a sol of each of zinc oxide, silicon dioxide (silica particulates), aluminium oxide, titanium oxide (titania particulates), zirconium oxide (zirconia particulates), tin oxide, beryllium oxide, antimony oxide, tungsten oxide, and cerium oxide, and mixed crystals of two or more of the sols. The diameter of the inorganic oxide particle is preferably 1 nm or more and 100 nm or less, and more preferably 1 nm or more and 50 nm or less from the viewpoint of assuring transparency of the hard coating film. An amount (concentration) of the inorganic oxide particles to be blended is preferably 40 wt % or more of all the components of the hard coating film and 60 wt % or less thereof from the viewpoint of assuring an appropriate level of at least one of hardness and toughness of the hard coating film. In addition, to the hard coating solution, for example, at least one of acetylacetone metal salt and ethylenediaminetetraacetic acid metal salt max be added as a curing catalyst. Furthermore, to the hard coating solution, a surfactant, a colorant, a solvent, or the like may be added according to necessity for at least assuring adhesion to the base 2 or facilitating formation.

The physical film thickness of the hard coating film is preferably 0.5 μm or more and 4.0 μm or less, and more preferably 1.0 μm or more and 3.0 μm or less. The lower limit of the film thickness range is determined since it is difficult to obtain a sufficient hardness if the film thickness is less than the lower limit. Meanwhile, the upper limit is determined since a possibility of causing a problem with physical properties such as generation of crack or fragility is significantly increased if the film thickness is greater than the upper limit.

Furthermore, a primer film may be added between the hard coating film and the surface of the base 2 as the intermediate film 3 from the viewpoint of improving adhesion of the hard coating film. Examples of a material of the primer film include polyurethane-based resin, acrylic resin, methacrylic resin, organosilicon-based resin, and a combination thereof. The primer film is suitably formed by applying a primer solution uniformly to the surface of the base 2. The primer solution is preferably a solution obtained by mixing the resin material and inorganic oxide particles in water or an alcohol-based solvent.

The dielectric multilayer films 4 and 4*a* each include one or more low refractive index dielectric layers 6, one or more high refractive index dielectric layers 8, an antibacterial layer 10, and an antifouling layer 12. The antifouling layer 12 may be omitted.

A plurality of the low refractive index dielectric layers 6 and a plurality of the high refractive index dielectric layers 8 are preferably disposed and are alternately disposed.

More specifically, the dielectric multilayer film 4 includes three low refractive index dielectric layers 6 and two high refractive index dielectric layers 8.

The dielectric multilayer film 4*a* includes three low refractive index dielectric layers 6 and three high refractive index dielectric layers 8.

The configuration of the dielectric multilayer film is not limited to the dielectric multilayer film 4, 4*a*.

The low refractive index dielectric layer 6 is preferably formed by deposition of a low refractive index material. The low refractive index material is, for example, at least one of silicon oxide (in particular, $SiO_2$) and magnesium fluoride (in particular, $MgF_2$).

The high refractive index dielectric layer 8 is preferably formed by deposition of a high refractive index material. The high refractive index material is, for example, at least one of zirconium oxide (in particular, $ZrO_2$), titanium oxide (in particular, $TiO_2$), tantalum oxide (in particular, $Ta_2O_5$), and niobium oxide (in particular, $Nb_2O_5$).

The deposition is preferably vacuum deposition. The deposition may be performed by ion-assisting with, for example, at least one of oxygen ions and argon ions, or performed while plasma treatment is performed. At least one of the low refractive index dielectric layer 6 and the high refractive index dielectric layer 8 may be formed by a method other than deposition, such as sputtering.

A layer closest to the base 2 in the dielectric multilayer film 4 shown in FIG. 1, that is, the first layer counted from the base 2 side (the same counting manner is applied below) is the low refractive index dielectric layer 6. In the dielectric multilayer film 4, the even layers are each the high refractive index dielectric layer 8 and the odd layers are each the low refractive index dielectric layer 6.

In the dielectric multilayer film 4*a* shown in FIG. 2, the odd layers are each the high refractive index dielectric layer 8, and the even layers are each the low refractive index dielectric layer 6.

Figure 3:
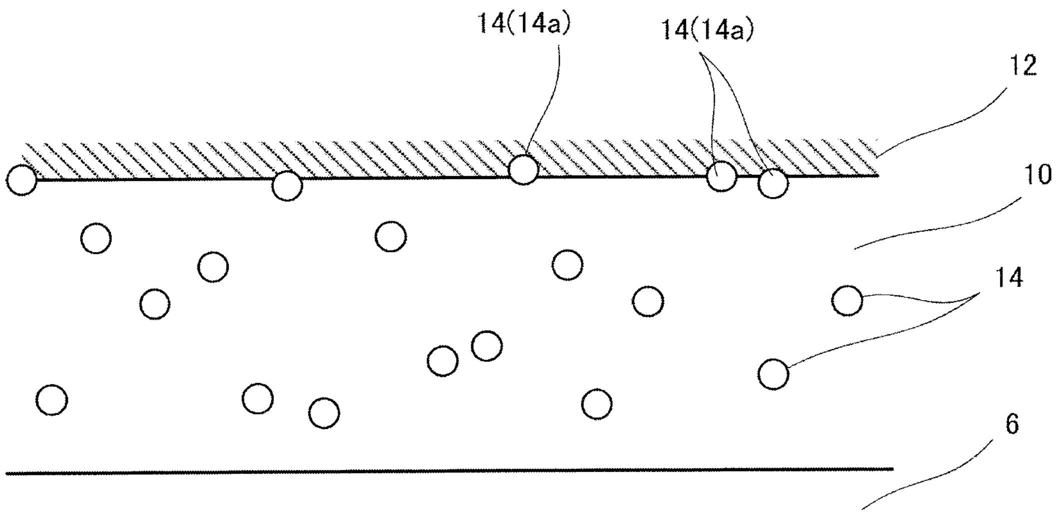
FIG. 3 is a schematic cross-sectional view of an antibacterial layer and an antifouling layer.

FIG. 3 is a schematic cross-sectional view of the antibacterial layer 10 and the antifouling layer 12.

The antibacterial layer 10 is a dielectric layer including metal particles 14. The metal particles 14 are derived from metal ions carried by metal ion-carrying zeolite. The metal particles 14 are derived from metal ions and are thus metal ions. However, in order to strictly confirm whether or not all of the metal particles 14 exist as metal ions in the antibacterial layer 10, multiple samples need to be observed by an electron microscope or the like and it requires significant cost and is not practical. A part of the metal particles 14 may not be in the form of ions. Therefore, in the description herein, the metal particles 14 are not described as metal ions and are described as the metal particles 14.

The antibacterial layer 10 is a layer farthest from the base 2, that is, an outermost layer, except for the antifouling layer 12 in the dielectric multilayer film 4, 4*a*. In other words, the antibacterial layer 10 is a layer closest to the air side except for the antifouling layer 12 in the dielectric multilayer film 4, 4*a*. In a case where the antifouling layer 12 is not provided, the antibacterial layer 10 is a layer farthest from the base 2 in the dielectric multilayer film 4, 4*a*, and a layer closest to the air side.

In the dielectric multilayer film 4, the antibacterial layer 10 is the sixth layer. In the dielectric multilayer film 4*a*, the antibacterial layer 10 is the seventh layer.

In the antibacterial layer 10, the metal particles 14 have an antibacterial property. By the metal ion-carrying zeolite, the metal particles 14 can be contained in the antibacterial layer 10. The metal ion-carrying zeolite is a material that imparts an antibacterial property, that is, an antibacterial material.

In the metal ion-carrying zeolite, the metal particles 14 are carried by zeolite (crystalline aluminosilicate) through ion exchange reaction or the like.

A typical composition formula of zeolite is, for example, $M^{n+}_{1/n}(AlO_2)^-$ $(SiO_2)_x \cdot yH_2O$ in which $M^{n+}$ represents an n-valent cation.

In the zeolite, metal ions are carried by a pore structure generated by Al.

As the zeolite, at least one of natural zeolite and artificial zeolite may be used, or various types of zeolites such as type A, type Y, and type P zeolites may be used.

The metal particles 14 carried by zeolite are, for example, at least one of silver ions, copper ions, and zinc ions.

The metal ion-carrying zeolite may carry one kind of the metal particles 14 selected from the above-described metal particles 14 or may carry two or more kinds of the metal particles 14 in combination. As the metal ion-carrying zeolite, one kind of metal ion-carrying zeolite may be used alone, or two or more kinds of metal ion-carrying zeolites may be used in combination.

The metal particles 14 are preferably silver particles (silver ions) since antibacterial performance per unit mass and durability with respect to water are excellent. Therefore, the metal ion-carrying zeolite is preferably silver ion-carrying zeolite.

In a case where a layer is formed by metal ion-carrying zeolite alone as an inorganic antibacterial material, a refractive index is increased as compared with the low refractive index dielectric layer 6. In a case where the metal ion-carrying zeolite is added to a deposition material for a low refractive index dielectric body, although the refractive index of a formed layer is increased, increase of the refractive index is small as compared with a layer formed by metal ion-carrying zeolite alone. Therefore, the antibacterial layer 10 preferably contains a low refractive index dielectric body. The low refractive index dielectric body is preferably $SiO_2$ from the viewpoint of allowing handling to be easier.

In this case, in the antibacterial layer 10, a structure derived from the metal ion-carrying zeolite that causes increase of the refractive index is added to the low refractive index dielectric body ($SiO_2$). The refractive index of the antibacterial layer 10 is increased as compared with the low refractive index dielectric layer 6 due to the metal ion-carrying zeolite being contained. However, the increase rate is small. Therefore, the antibacterial layer 10 can be handled optically in the same manner as the low refractive index dielectric layer 6. Therefore, in the dielectric multilayer film 4, desired optical characteristics are more easily assured.

The antibacterial layer 10 is formed of a sintered body obtained by collectively sintering the metal ion-carrying zeolite and the low refractive index dielectric body. The antibacterial layer 10 is preferably formed by depositing the sintered body.

The antibacterial layer 10 is preferably deposited from a sintered body obtained by collectively sintering silver ion-carrying zeolite and $SiO_2$.

The molecular structure of the antibacterial layer 10 resembles a molecular structure obtained by collectively depositing $SiO_2$ and $Al_2O_3$ because at least a part of zeolite, which is aluminosilicate, acts as $SiO_2$ and $Al_2O_3$ during deposition. The molecular structure of the antibacterial layer 10 may be specified differently for each deposition, and multiple samples need to be thoroughly observed by an electron microscope or the like. Thus, the specification of the molecular structure is difficult even for a person skilled in the art and is not practical from the viewpoint of cost. Therefore, for example, the antibacterial layer 10 can be expressed as a layer formed of a material containing metal ion-carrying zeolite. Furthermore, the antibacterial layer 10 can be expressed as a layer containing metal ion-carrying zeolite. Moreover, the antibacterial layer 10 can be expressed as a layer containing metal ion-carrying zeolite, $SiO_2$, and $Al_2O_3$.

The antibacterial layer 10 preferably has a physical film thickness of less than 50 nm from the viewpoint of inhibiting occurrence of abnormal outer appearance.

As described above, the characteristics of the antibacterial layer 10 resemble characteristics of an $SiO_2$+$Al_2O_3$-mixture layer formed by simultaneously depositing $SiO_2$ and $Al_2O_3$.

The $SiO_2$+$Al_2O_3$-mixture layer has a water vapor barrier property. The water vapor permeability of the $SiO_2$+$Al_2O_3$-mixture layer is lower than the water vapor permeability of an $SiO_2$ layer which is a layer made of $SiO_2$. The water vapor barrier property in the $SiO_2$+$Al_2O_3$-mixture layer is caused by crosslinking of $SiO_2$ caused by $Al_2O_3$. In the $SiO_2$+$Al_2O_3$-mixture layer, in a case where an amount of $Al_2O_3$ is, for example, about 2% by weight or more with respect to an amount of $SiO_2$, the water vapor permeability becomes sufficiently lower than that of the $SiO_2$ layer.

Meanwhile, the base 2 of the plastic lens 1 for spectacles is made of plastic, and thus has water content. Furthermore, the base 2 is made of plastic and is thus swollen by moisture absorption.

In a case where a layer having a predetermined or higher level of water vapor barrier property exists in the base 2, the water content of the base 2 is not released to the outside. In this case, a portion at which water content is locally accumulated is generated between the base 2 and the layer having the predetermined or higher level of water vapor barrier property with elapse of time. The portion is deformed linearly or deformed into a dot-like shape, and abnormal outer appearance is caused. Such linear or dot-shaped deformation is called blister or wrinkle.

Therefore, the antibacterial layer 10 has a physical film thickness of, for example, less than 50 nm from the viewpoint of inhibiting the water vapor barrier property and then inhibiting occurrence of abnormal outer appearance.

Whether or not ion-assisting is performed and the result of a test for the water vapor permeability closely associated with the density of the deposited film, for the $SiO_2$ film and the $Al_2O_3$ film, are indicated below in Table 1. The column labeled "No." in Table 1 describes the order starting from the highest water vapor permeability.

In this test, a PET (polyethylene terephthalate) film is a base. A water vapor permeability (gram per cubic meter for one-day, $g/m^3\cdot day$) is measured for each of a case where only a base is used, and a case where an $SiO_2$ film, an $Al_2O_3$ film, or an $SiO_2$+$Al_2O_3$-mixture film is deposited on the base while changing between use of ion-assisting and non-use thereof.

In the case where only the base is used, the water vapor permeability is 7.29.

Meanwhile, in the case where the $SiO_2$ film, the $Al_2O_3$ film, and the $SiO_2$+$Al_2O_3$-mixture film (deposition materials are described in the column for "material" in Table 1) are deposited without ion-assisting such that the film thicknesses are 90.3 nm, 94.8 nm, and 74.4 nm, the water vapor permeabilities are 6.75, 6.28, and 6.12, and are slightly lower than that in the case where only the base is used. This is because the $SiO_2$ film, the $Al_2O_3$ film, and the $SiO_2$+$Al_2O_3$-mixture film prevent permeation of water vapor Furthermore, in a case where the $SiO_2$ film is deposited by ion-assisting (acceleration voltage of 900 volts (V), acceleration current of 900 milliamperes (mA), bias current of 600 mA, and introduced oxygen ($O_2$) gas at 50 sccm, by means of an ion gun) such that the film thickness is 69.1 nm, the water vapor permeability is 3.77 and is thus more greatly reduced. This is because the density of the $SiO_2$ film formed by ion-assisted deposition is greater than the density in the case of ion-assisting being not performed, and the $SiO_2$ film having such a great density further prevents permeation of water vapor.

Similarly, in a case where the $Al_2O_3$ film is deposited by ion-assisting (acceleration voltage of 1000 V, acceleration current of 1000 mA, bias current of 600 mA, and introduced oxygen gas at 50 sccm) such that the film thickness is 79.0 nm, the water vapor permeability is 0.89 and is thus greatly reduced. This is because the density of the $Al_2O_3$ film formed by ion-assisted deposition is greater than the density in the case of ion-assisting being not performed, and the $Al_2O_3$ film having such a great density further prevents permeation of water vapor.

Furthermore, in a case where the $SiO_2$+$Al_2O_3$-mixture film is similarly deposited by performing ion-assisting similar to that for the $SiO_2$ film such that the film thickness is 75.0 nm, the water vapor permeability is 1.61 and is thus low. This is because the density of the $SiO_2$+$Al_2O_3$-mixture film formed by ion-assisted deposition is greater than the density in the case of ion-assisting being not performed, and the $SiO_2$+$Al_2O_3$-mixture film having such a great density further prevents permeation of water vapor The above-described test results indicate that the $SiO_2$+$Al_2O_3$-mixture layer has high water vapor barrier property.

Even in a case where the physical film thickness of the antibacterial layer 10 is, for example, less than 50 nm, the antibacterial layer 10 sufficiently exhibits an antibacterial function.

That is, as shown in FIG. 3, the antibacterial function of the antibacterial layer 10 is mainly exhibited by surface layer metal particles 14*a*, among the metal particles 14, which are disposed on the surface layer portion of the antibacterial layer 10 and can be brought into contact with bacteria and the like.

Meanwhile, it is known that, in an antibacterial film which is deposited on one surface of a substrate by using a sintered body obtained by collectively sintering silver ion-carrying zeolite and $SiO_2$, and which has a physical film thickness of 100 nm, silver atoms uniformly exist so as to maintain a predetermined atom concentration range in the antibacterial film depth direction. That is, according to Program 2.3 "Evaluation of various physical properties and antibacterial effect of thin films produced with antibacterial deposition materials" of the 36th conference of the Optical Thin-Film Science and Engineering group which was held online on Nov. 10, 2020, a graph representing a relationship between an etching depth (horizontal axis) and an atom concentration (vertical axis) according to X-ray photoelectron spectroscopy (XPS) using ion etching indicates that the silver atom concentration is in a range of $10^{-2.1}$ to $10^{-1.5}$ [%] in a portion from the etching depth of 0 nm (surface) to 100 nm (interface with the substrate). Therefore, in the antibacterial film formed by a sintered body obtained by collectively sintering silver ion-carrying zeolite and $SiO_2$, silver atoms uniformly exist in the depth direction.

Accordingly, even if the physical film thickness of the antibacterial layer 10 is less than 50 nm, a state in which the surface layer metal particles 14*a* are disposed in the antibacterial layer 10 is considered to be not greatly different from the state for the antibacterial layer 10 having the physical film thickness of 50 nm or more. Therefore, the antibacterial function of the antibacterial layer 10 is exhibited similarly to that of the antibacterial layer 10 having a physical film thickness of 50 nm or more.

The antifouling layer 12 is disposed on the antibacterial layer 10 (on the air side). The antifouling layer 12 imparts an antifouling function to the plastic lens 1, 1*a* for spectacles. The antifouling function includes at least one of a water-repellent function and an oil-repellent function.

In the dielectric multilayer film 4, the antifouling layer 12 is the seventh laver. In the dielectric multilayer film 4*a*, the antifouling layer 12 is the eighth layer.

TABLE 1

| | | | | | Ion gun condition | | | |
|---|---|---|---|---|---|---|---|---|
| No. | Water vapor permeability [$g/m^3\cdot day$] | Material | Ion-assisting | Film thickness [nm] | Acceleration voltage [V] | Acceleration current [mA] | Bias current [mA] | Introduced gas $O_2$ [sccm] |
| 1 | 7.29 | Only PET film | — | — | — | — | — | — |
| 2 | 6.75 | SiO2 | not performed | 90.3 | — | — | — | — |
| 3 | 6.28 | Al2O3 | not performed | 94.8 | — | — | — | — |
| 4 | 6.12 | SiO2 + Al2O3 | not performed | 74.4 | — | — | — | — |
| 5 | 3.77 | SiO2 | performed | 69.1 | 900 | 900 | 600 | 50 |
| 7 | 0.89 | Al2O3 | performed | 79.0 | 1000 | 1000 | 600 | 50 |
| 6 | 1.61 | SiO2 + Al2O3 | performed | 75.0 | 900 | 900 | 600 | 50 |

The antifouling layer 12 is formed by, for example, a known deposition method or ion sputtering method.

The antifouling layer 12 is, for example, obtained by polycondensation of an organosilicon compound. Through the polycondensation, a coating can be formed as a thick film and densified, and adhesion to an adjacent layer and surface hardness in the dielectric multilayer film 4, 4*a* are enhanced. Therefore, the antifouling layer 12 has oil-repellency in addition to water-repellency. Furthermore, for the antifouling layer 12, a coating having excellent dirt wiping property can be easily obtained.

Before the poly condensation, the organosilicon compound is preferably a compound which has a silicon-containing functional group and is represented by —$SiR_yX_{3-y}$ (R represents a monovalent organic group, X represents a hydrolyzable group, and y represents an integer from 0 to 2). X represents a group the examples of which include an alkoxy group such as —$OCH_3$ and —$OCH_2CH_3$, an acyloxy group such as —$OCOCH_3$, a ketoxime group such as —ON═$CR_aR_b$ ($R_a$, $R_b$ each represent a monovalent organic group), a halogen group such as —Cl and —Br, and an amino group such as —$NR_cR_d$($R_c$, $R_d$ each represent a monovalent organic group).

As such an organosilicon compound, a fluorine-containing organosilicon compound is suitably used. A fluorine-containing organosilicon compound is comprehensively excellent in water and oil-repellency, electric insulation, demoldability, solvent resistance, lubricity, heat resistance, and defoaming property. Particularly, an organosilicon compound having a perfluoroalkyl group or a perfluoropolyether group in a molecule and having a relatively large molecular weight of about 1000 to 50000 has excellent antifouling property.

The antifouling layer 12 has an antifouling function, and thus has a molecular structure in which gaps are greater as compared with other layers.

Accordingly, the antibacterial action of the antibacterial layer 10 disposed immediately below the antifouling layer 12 is not hindered by the antifouling layer 12.

The dielectric multilayer films 4 and 4*a* allow an optical function (optical characteristics) to be imparted to the plastic lenses 1 and 1*a* for spectacles. For example, the optical function is at least one of an antireflection function (antireflection characteristics) and a blue light cutting function (blue light cutting characteristics).

Furthermore, the antifouling layers 12 of the dielectric multilayer films 4 and 4*a* allow an antifouling function (antifouling characteristics) to be imparted to the plastic lenses 1 and 1*a* for spectacles.

Examples which belong to the present invention, and comparative examples which do not belong to the present invention will be described below.

The scope of the present invention is not limited to the following examples.

According to interpretation of the present invention, a part of the following examples may be substantially regarded as the comparative examples or a part of the following comparative examples may be substantially regarded as the examples.

The plastic lens shown in FIG. 1 for spectacles according to each of Examples 1 to 3 and Comparative examples 2 to 3 was produced. The plastic lens 1 shown in FIG. 1 for spectacles according to Comparative example 1 was produced except that the antibacterial layer 10 was not disposed. The physical film thickness and the like of each of the layers of these plastic lenses are indicated below in Table 2.

TABLE 2

| | Material | Refractive index at 500 nm | Physical film thickness [nm] Comparative example 1 | Example 1 | Example 2 | Example 3 | Comparative example 2 | Comparative example 3 |
|---|---|---|---|---|---|---|---|---|
| Base side | | | | | | | | |
| First layer | $SiO_2$ | 1.470 | 32.00 | 32.00 | 32.00 | 32.00 | 32.00 | 32.00 |
| Second layer | $ZrO_2$ | 2.106 | 37.00 | 37.00 | 37.00 | 37.00 | 37.00 | 37.00 |
| Third layer | $SiO_2$ | 1.470 | 24.00 | 24.00 | 24.00 | 24.00 | 24.00 | 24.00 |
| Fourth layer | $ZrO_2$ | 2.106 | 51.00 | 51.00 | 51.00 | 51.00 | 51.00 | 51.00 |
| Fifth layer | $SiO_2$ | 1.470 | 94.00 | 79.00 | 64.00 | 44.10 | 34.00 | 24.00 |
| Sixth layer | Sintered body A | 1.476 | — | 15.00 | 30.00 | 49.90 | 60.00 | 70.00 |
| Seventh layer | Antifouling layer | 1.350 | 5.00 | 5.00 | 5.00 | 5.00 | 5.00 | 5.00 |
| Air side | | | | | | | | |
| Constant temperature and humidity test 60° C.-95% RH | | One-day | no problem | no problem | no problem | no problem | no problem | no problem |
| | | Three-days | no problem | no problem | no problem | no problem | center portion was blistered | center portion was blistered |
| | | Five-days | no problem | no problem | no problem | no problem | center portion was blistered | center portion was blistered |
| | | Evaluation | excellent | excellent | excellent | excellent | poor | poor |

The base 2 was the same among Examples 1 to 3 and Comparative examples 1 to 3. The base 2 had a refractive index of 1.60. The material of the base 2 was thiourethane resin. The base 2 was a spherical lens having a power of S−2.00.

The intermediate film 3 was the same among Examples 1 to 3 and Comparative examples 1 to 3. The intermediate film 3 was a hard coating film. The intermediate film 3 had a refractive index of 1.60. The material of the intermediate film 3 was thermosetting silicone resin. The physical film thickness of the intermediate film 3 was 2.0 μm. In each of Examples 1 to 3 and Comparative examples 1 to 3, the intermediate films 3 having the same structure were provided on the front and the rear surfaces of the base 2.

The intermediate film 3 was more specifically formed as follows. That is, 206 g of methanol, 300 g of methanol-dispersed titania sol (manufactured by JGC Catalysts and Chemicals Ltd., solid content of 30%), 60 g of γ-glycidoxypropyltrimethoxysilane, 30 g of γ-glycidoxypropylmethyldiethoxysilane, and 60 g of tetraethoxysilane were dropped into a reaction vessel, and 0.01 N of hydrochloric acid aqueous solution was dropped into the mixture, and the obtained mixture was stirred and hydrolyzed. Subsequently, 0.5 g of a flow regulating agent and 1.0 g of a catalyst were added, and the obtained mixture was stirred at room temperature for three hours, thereby forming the hard coating solution. The hard coating solution was applied to both surfaces of the base 2, and heated at 120° C. for 1.5 hours and hardened, thereby forming the hard coating films each having a film thickness of 2.0 μm.

The dielectric multilayer film 4 of each of Examples 1 to 3 and Comparative examples 1 to 3 was an antireflection film. In each of Examples 1 to 3 and Comparative examples 1 to 3, the dielectric multilayer films 4 having the same structure were provided on the front and the rear surfaces of the base 2.

In each of Examples 1 to 3 and Comparative examples 1 to 3, the low refractive index dielectric layer 6 was an $SiO_2$ layer. The $SiO_2$ layer had a refractive index of 1.470. Each of the $SiO_2$ layers was formed by deposition.

In each of Examples 1 to 3 and Comparative examples 1 to 3, the high refractive index dielectric layer 8 was a $ZrO_2$ layer which was a layer made of $ZrO_2$. The $ZrO_2$ layer had a refractive index of 2.106. Each of the $ZrO_2$ layers was formed by deposition.

The antibacterial layer 10 of each of Examples 1 to 3 and Comparative examples 2 to 3 was formed through deposition by using, as a deposition material, a sintered body obtained by collectively sintering silver ion-carrying zeolite and $SiO_2$. A weight ratio between the components in the sintered body satisfied silver ion-carrying zeolite:$SiO_2$=3:7. That is, a proportion of the added silver ion-carrying zeolite in the sintered body was 30% by weight. Hereinafter, such a sintered body is referred to as sintered body A. Each of the antibacterial layers 10 formed from the sintered body A had a refractive index of 1.476.

The antibacterial layer 10 of Example 1 had a physical film thickness of 15.00 nm. The antibacterial layer 10 of Example 2 had a physical film thickness of 30.00 nm. The antibacterial layer 10 of Example 3 had a physical film thickness of 49.90 nm. The antibacterial layer 10 of Comparative example 1 had a physical film thickness of 0 nm. The antibacterial layer 10 of Comparative example 2 had a physical film thickness of 60.00 nm. The antibacterial layer 10 of Comparative example 3 had a physical film thickness of 70.00 nm.

From the viewpoint of similarity of the refractive index, each antibacterial layer 10 was optically identical to the low refractive index dielectric layer 6 at the fifth layer adjacent to the antibacterial layer 10. From the viewpoint of retaining similarity of antireflection characteristics, in each of Examples 1 to 3 and Comparative examples 1 to 3, the sum of the physical film thickness of the antibacterial layer 10 and the physical film thickness of the low refractive index dielectric layer 6 at the fifth layer adjacent to the antibacterial layer 10 was 94.00 nm, which was the same among Examples 1 to 3 and Comparative examples 1 to 3.

The low refractive index dielectric layer 6 at the fifth layer in Example 1 had a physical film thickness of 79.00 nm. The low refractive index dielectric layer 6 at the fifth layer in Example 2 had a physical film thickness of 64.00 nm. The low refractive index dielectric layer 6 at the fifth layer in Example 3 had a physical film thickness of 44.10 nm. The low refractive index dielectric layer 6 at the fifth layer in Comparative example 1 had a physical film thickness of 94.00 nm. The low refractive index dielectric layer 6 at the fifth layer in Comparative example 2 had a physical film thickness of 34.00 nm. The low refractive index dielectric layer 6 at the fifth layer in Comparative example 3 had a physical film thickness of 24.00 nm.

In each of Examples 1 to 3 and Comparative examples 1 to 3, the antifouling layer 12 was formed by depositing OF-SR manufactured by Canon Optron, Inc. Each antifouling layer 12 had a physical film thickness of 5 nm.

The plastic lens 1*a* shown in FIG. 2 for spectacles according to each of Examples 4 to 6 and Comparative examples 5 to 6 was produced. The plastic lens 1*a* shown in FIG. 2 for spectacles according to Comparative example 4 was produced except that the antibacterial layer 10 was not disposed. The physical film thickness and the like of each of the layers of these plastic lenses are indicated below in Table 3.

TABLE 3

| | Material | Refractive index at 500 nm | Physical film thickness [nm] Comparative example 4 | Example 4 | Example 5 | Example 6 | Comparative example 5 | Comparative example 6 |
|---|---|---|---|---|---|---|---|---|
| Base side | | | | | | | | |
| First layer | $ZrO_2$ | 2.106 | 18.00 | 18.00 | 18.00 | 18.00 | 18.00 | 18.00 |
| Second layer | $SiO_2$ | 1.470 | 23.00 | 23.00 | 23.00 | 23.00 | 23.00 | 23.00 |
| Third layer | $ZrO_2$ | 2.106 | 40.00 | 40.00 | 40.00 | 40.00 | 40.00 | 40.00 |
| Fourth layer | $SiO_2$ | 1.470 | 19.00 | 19.00 | 19.00 | 19.00 | 19.00 | 19.00 |
| Fifth layer | $ZrO_2$ | 2.106 | 26.00 | 26.00 | 26.00 | 26.00 | 26.00 | 26.00 |
| Sixth layer | $SiO_2$ | 1.470 | 84.00 | 69.00 | 54.00 | 34.10 | 24.00 | 14.00 |
| Seventh layer | Sintered body A | 1.476 | — | 15.00 | 30.00 | 49.90 | 60.00 | 70.00 |
| Eighth layer | Antifouling layer | 1.350 | 5.00 | 5.00 | 5.00 | 5.00 | 5.00 | 5.00 |
| Air side | | | | | | | | |
| Constant temperature and humidity test 60° C.-95% RH | | One-day | no problem | no problem | no problem | no problem | no problem | no problem |
| | | Three-days | no problem | no problem | no problem | no problem | center portion was blistered | center portion was blistered |

TABLE 3-continued

| Material | Refractive index at 500 nm | Physical film thickness [nm] Comparative example 4 | Example 4 | Example 5 | Example 6 | Comparative example 5 | Comparative example 6 |
|---|---|---|---|---|---|---|---|
| | Five-days | no problem | no problem | no problem | no problem | center portion was blistered | center portion was blistered |
| | Evaluation | excellent | excellent | excellent | excellent | poor | poor |

The base 2 and the intermediate film 3 of each of Examples 4 to 6 and Comparative examples 4 to 6 had the same structures as those of each of Examples 1 to 3 and Comparative Examples 1 to 3.

In each of Examples 4 to 6 and Comparative examples 4 to 6, the dielectric multi layer film 4*a* was an anti reflection film. In each of Examples 4 to 6 and Comparative examples 4 to 6, the dielectric multilayer films 4*a* having the same structure were provided on the front and the rear surfaces of the base 2.

The low refractive index dielectric layer 6 and the high refractive index dielectric layer 8 of each of Examples 4 to 6 and Comparative examples 4 to 6 had the same structures as those of each of Examples 1 to 3 and Comparative examples 1 to 3.

The antifouling layer 12 of each of Examples 4 to 6 and Comparative examples 4 to 6 had the same structure as that of each of Examples 1 to 3 and Comparative examples 1 to 3.

The antibacterial layer 10 of each of Examples 4 to 6 and Comparative examples 5 to 6 was formed through deposition by using, as a deposition material, the sintered body A obtained by collectively sintering the silver ion-carrying zeolite and $SiO_2$.

The antibacterial layer 10 of Example 4 had a physical film thickness of 15.00 nm. The antibacterial layer 10 of Example 5 had a physical film thickness of 30.00 nm. The antibacterial layer 10 of Example 6 had a physical film thickness of 49.90 nm. The antibacterial layer 10 of Comparative example 4 had a physical film thickness of 0 nm. The antibacterial layer 10 of Comparative example 5 had a physical film thickness of 60.00 nm. The antibacterial layer 10 of Comparative example 6 had a physical film thickness of 70.00 nm.

From the viewpoint of similarity of the refractive index, each antibacterial layer 10 was optically identical to the low refractive index dielectric layer 6 at the sixth layer adjacent to the antibacterial layer 10. From the viewpoint of retaining similarity of antireflection characteristics, in each of Examples 4 to 6 and Comparative examples 4 to 6, the sum of the physical film thickness of the antibacterial layer 10 and the physical film thickness of the low refractive index dielectric layer 6 at the sixth layer adjacent to the antibacterial layer 10 was 84.00 nm, which was the same among Examples 4 to 6 and Comparative examples 4 to 6.

The low refractive index dielectric layer 6 at the sixth layer in Example 4 had a physical film thickness of 69.00 nm. The low refractive index dielectric layer 6 at the sixth layer in Example 5 had a physical film thickness of 54.00 nm. The low refractive index dielectric layer 6 at the sixth layer in Example 6 had a physical film thickness of 34.10 nm. The low refractive index dielectric layer 6 at the sixth layer in Comparative example 4 had a physical film thickness of 84.00 nm. The low refractive index dielectric layer 6 at the sixth layer in Comparative example 5 had a physical film thickness of 24.00 nm. The low refractive index dielectric layer 6 at the sixth layer in Comparative example 6 had a physical film thickness of 14.00 nm.

For each of Examples 1 to 6 and Comparative examples 1 to 6, a spectral reflectance distribution in a visible light range and a range adjacent thereto was examined. In the description herein, the visible light range is a range in which the wavelength is 400 nm or more and 780 nm or less.

Figure 4:
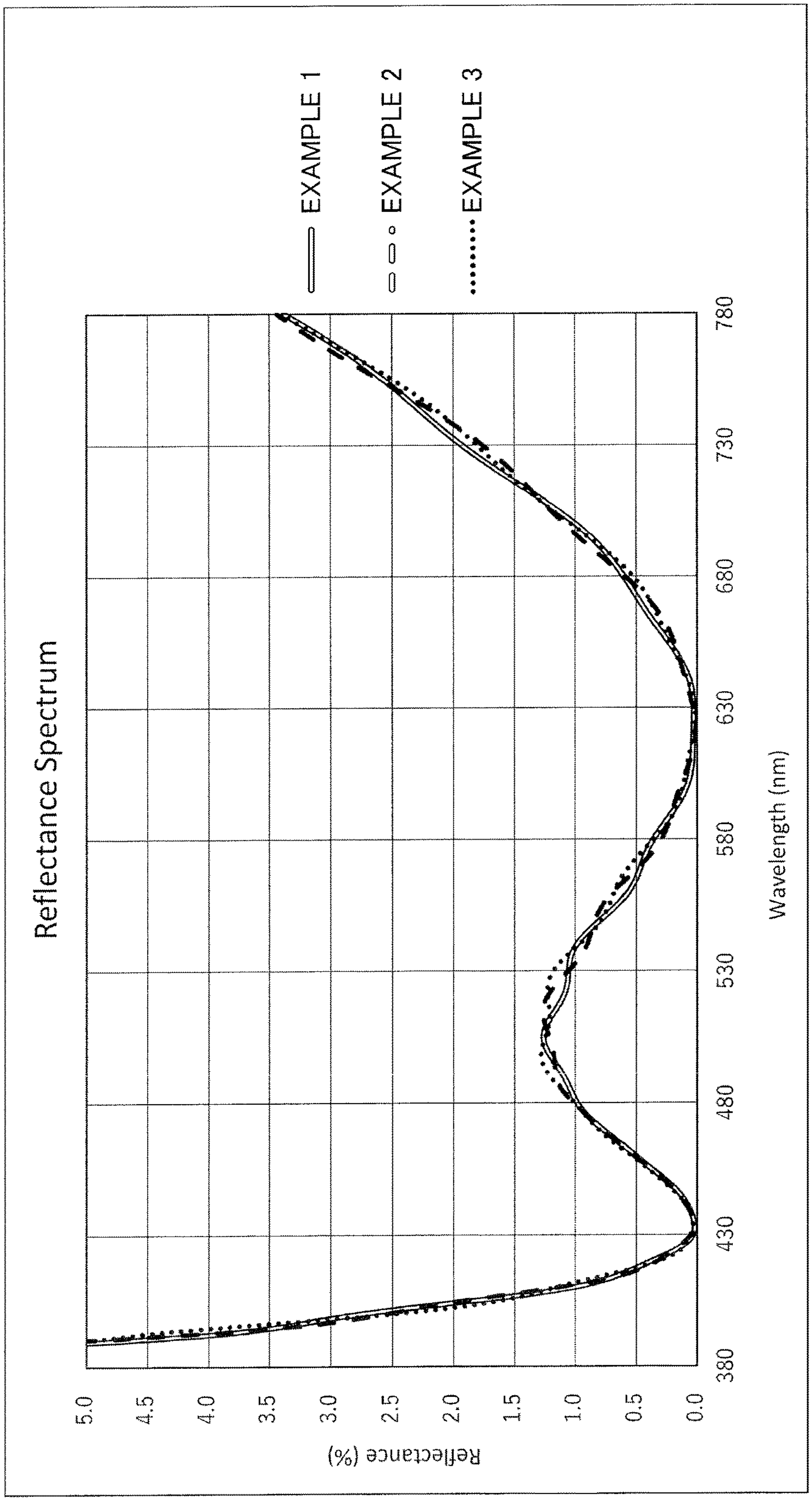
FIG. 4 shows a graph representing a spectral reflectance distribution in a visible light range and a range adjacent thereto, according to Examples 1 to 3.
Figure 5:
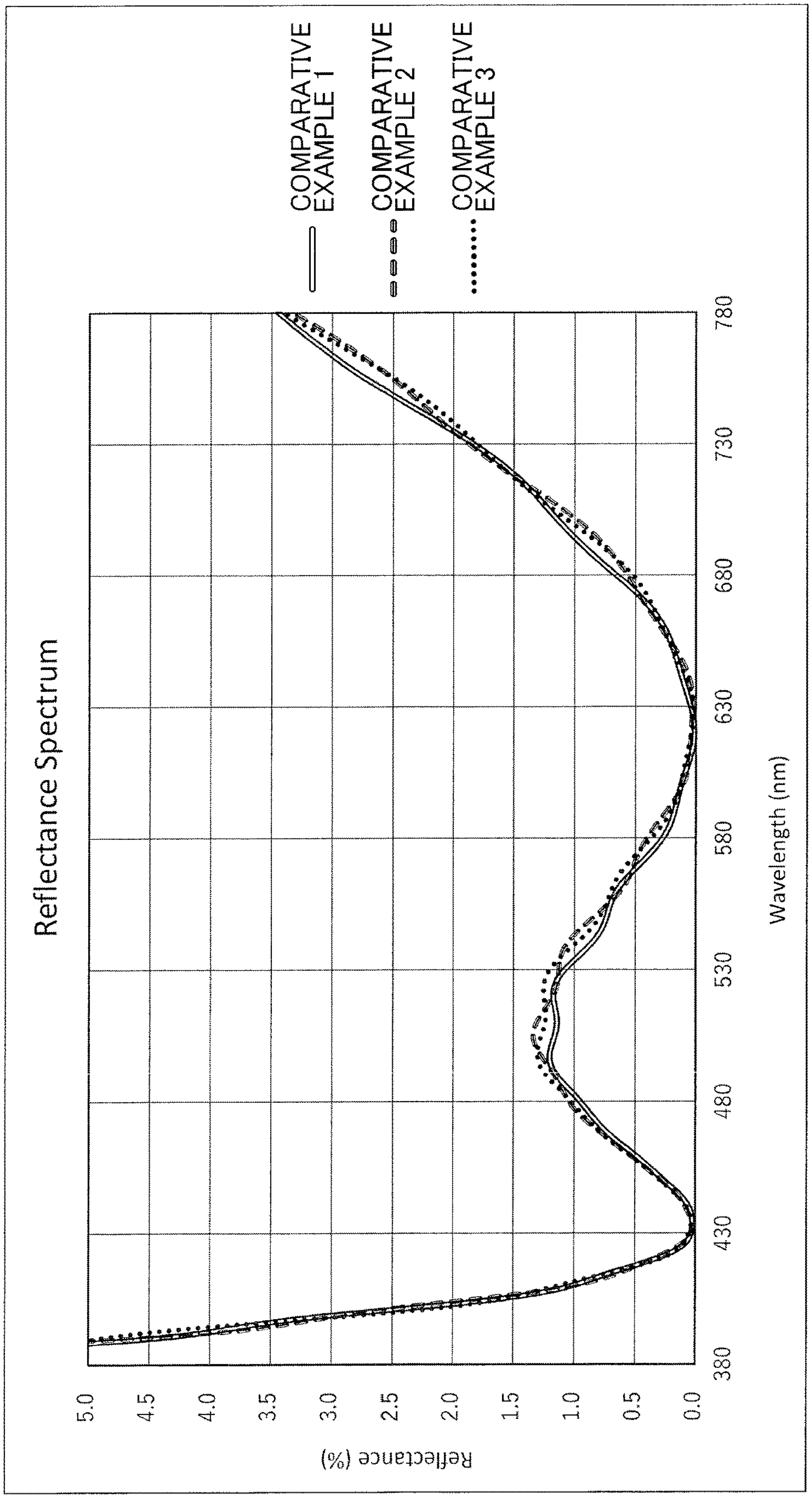
FIG. 5 shows a graph representing a spectral reflectance distribution in a visible light range and a range adjacent thereto, according to Comparative Examples 1 to 3.
Figure 6:
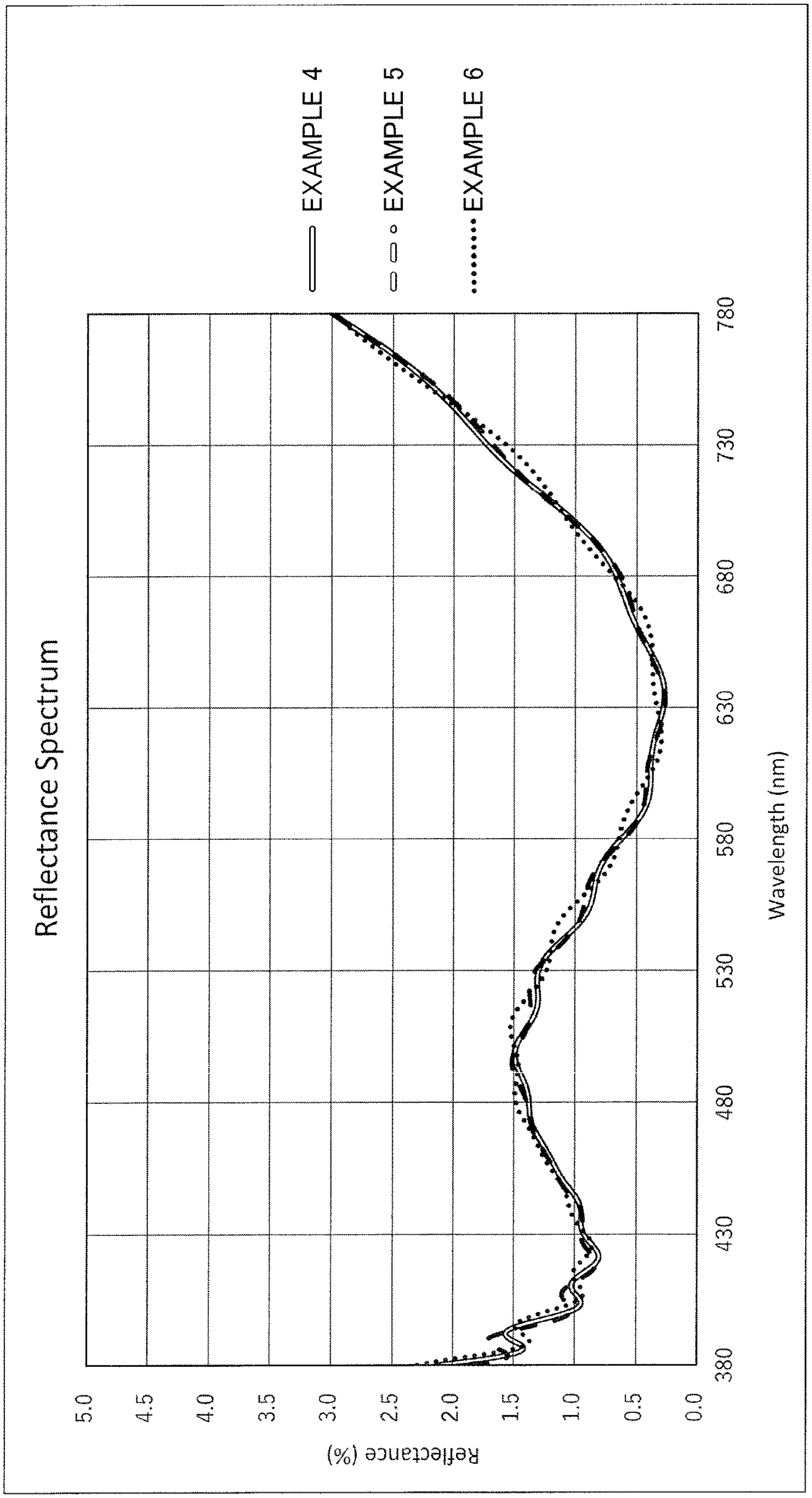
FIG. 6 shows a graph representing a spectral reflectance distribution in a visible light range and a range adjacent thereto, according to Examples 4 to 6.
Figure 7:
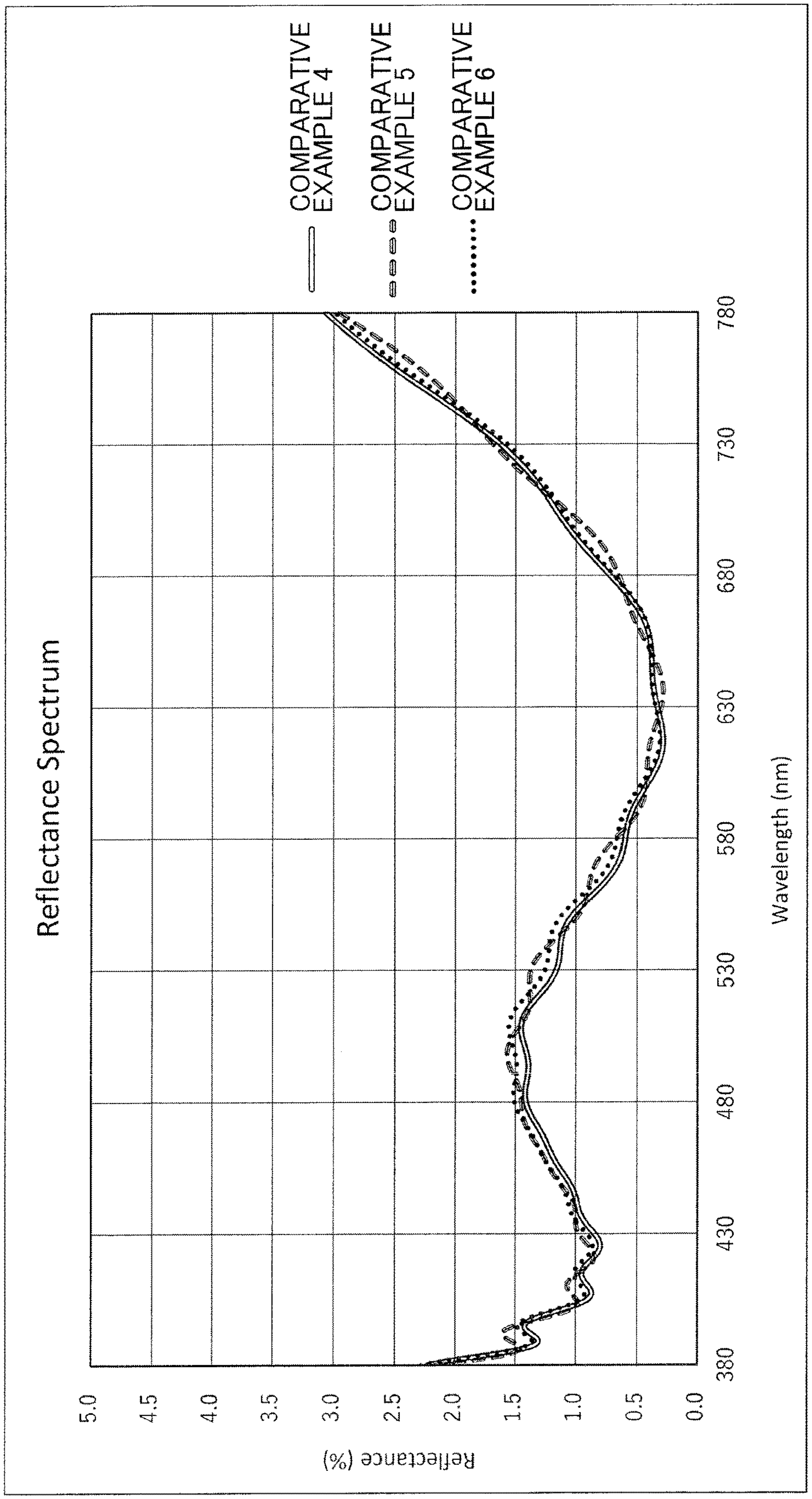
FIG. 7 shows a graph representing a spectral reflectance distribution in a visible light range and a range adjacent thereto, according to Comparative examples 4 to 6.

FIG. 4 shows a graph representing a spectral reflectance distribution in a visible light range and a range adjacent thereto, according to Examples 1 to 3. FIG. 5 shows a graph representing a spectral reflectance distribution in a visible light range and a range adjacent thereto, according to Comparative Examples 1 to 3. FIG. 6 shows a graph representing a spectral reflectance distribution in a visible light range and a range adjacent thereto, according to Examples 4 to 6. FIG. 7 shows a graph a representing a spectral reflectance distribution in a visible light range and a range adjacent thereto, according to Comparative examples 4 to 6.

According to these figures, in each of Examples 1 to 6 and Comparative examples 1 to 6, antireflection characteristics were observed in the visible light range.

A constant temperature and humidity test was performed in order to examine durability for each of Examples 1 to 6 and Comparative examples 1 to 6.

The constant temperature and humidity test was performed as follows. That is, samples of Examples 1 to 6 and Comparative examples 1 to 6 were each placed in a thermohygrostat maintained at a temperature of 60° C. and a relative humidity of 95%, for three predetermined time periods, and thereafter taken out, and the state of the sample was observed. The predetermined time periods were a period of one-day, a period of three-days, and a period of five-days.

At the lower portions in Table 2 and Table 3, the results of the constant temperature and humidity test are indicated.

In the one-day constant temperature and humidity test, a problem with abnormal outer appearance or the like was not observed in any of the samples. In the three-day and the five-day constant temperature and humidity tests, blister occurring at the center portion of the plastic lens 1 for spectacles was observed in each of Comparative examples 2, 3, 5, and 6 (Evaluation "poor").

In each of Comparative examples 2, 3, 5, and 6, it is considered that the antibacterial layer 10 had a physical film thickness of 60 nm or more, and the water vapor barrier property of the antibacterial layer 10 was at a predetermined or higher level, and thus, water content was not released well from the base 2, leading to abnormal outer appearance in which blisters occurred.

In each of Comparative examples 1 and 4, abnormal outer appearance was not observed in both the three-day and the five-day constant temperature and humidity tests (Evaluation "excellent"). However, in each of Comparative examples 1 and 4, the antibacterial layer 10 was not disposed and thus, an antibacterial effectiveness was not exhibited.

In each of Examples 1 to 6, abnormal outer appearance was not observed in each of the one-day, the three-day, and the five-day constant temperature and humidity tests (Evaluation "excellent"). In addition, in each of Examples 1 to 6, the antibacterial layer 10 was disposed and the antibacterial effectiveness was thus exhibited.

Furthermore, for each of Example 2 and Comparative example 1, an antibacterial test in accordance with ISO22196 was performed.

That is, a test bacterial solution of *Staphylococcus aureus* was inoculated in each of Comparative example 1 and Example 2 (antibacterial test 1). The viable cell count of the test bacterial solution was $4.9\times10^5$ cells/ml. A logarithm (log) of the viable cell count obtained immediately after the inoculation and a logarithm (log) of the viable cell count obtained after 24 hours from the inoculation were examined. Comparative example 1 was a plastic lens, for spectacles, which had a standard coating, and served as a reference in the antibacterial test. An antibacterial activity R of Example 2 was calculated. The antibacterial activity R was calculated by the following equation (1). In the equation (1), B represents the average value (the number of cells) of the viable cell count of the reference as obtained after 24 hours, and C represents an average value (the number of cells) of the viable cell count of the antibacterial product as obtained after 24 hours.

$$R=\log(B/C) \qquad (1)$$

A test bacterial solution of *Escherichia coli* was inoculated in each of Comparative example 1 and Example 2 (antibacterial test 2). The viable cell count of the test bacterial solution was $6.6\times10^5$ cells/ml. A logarithm of the viable cell count obtained immediately after the inoculation and a logarithm of the viable cell count obtained after 24 hours from the inoculation were examined. The antibacterial activity R of Example 2 was calculated.

A test bacterial solution of *Staphylococcus aureus* was inoculated in each of Comparative example 1 and Example 2 in which lightproof treatment was already performed, similarly to the antibacterial test 1 (antibacterial test 3). The viable cell count of the test bacterial solution was $4.9\times10^5$ cells/ml. The lightproof treatment of the test piece belonged to classification 2 of sustainability criteria of the Society of International sustaining growth for Antimicrobial Articles. A logarithm of the viable cell count obtained immediately after the inoculation and a logarithm of the viable cell count obtained after 24 hours from the inoculation were examined. The antibacterial activity R of Example 2 was calculated.

In addition, the test bacterial solution of *Escherichia coli* was inoculated in each of Comparative example 1 and Example 2 in which lightproof treatment was already performed, similarly to the antibacterial test 3 (antibacterial test 4). The viable cell count of the test bacterial solution was $6.6\times10^5$ cells/ml. A logarithm of the viable cell count obtained immediately after the inoculation and a logarithm of the viable cell count obtained after 24 hours from the inoculation were examined. The antibacterial activity R of Example 2 was calculated.

The results of such antibacterial tests are indicated below in Table 4.

TABLE 4

| | | *Staphylococcus aureus* | | *Escherichia coli* | |
|---|---|---|---|---|---|
| Sample | Elapse of time | log | Antibacterial activity [R] | log | Antibacterial activity [R] |
| — | Immediately after inoculation [$U_0$] | 4.04 | — | 4.10 | — |
| Comparative example 1 | After 24 hours [$U_t$] | 4.29 | — | 5.99 | — |
| Example 2 | After 24 hours [$A_t$] | −0.10 | 4.3 | 0.39 | 5.6 |
| | | *Staphylococcus aureus* Lightproof treatment | | *Escherichia coli* Lightproof treatment | |
| Sample | Elapse of time | log | Antibacterial activity [R] | log | Antibacterial activity [R] |
| — | Immediately after inoculation [$U_0$] | 4.07 | — | 4.10 | — |
| Comparative example 1 | After 24 hours [$U_t$] | 4.19 | — | 6.07 | — |
| Example 2 | After 24 hours[$A_t$] | <−0.20 | 4.3 | <−0.20 | 6.2 |

In the antibacterial test in accordance with ISO22196, in a case where the antibacterial activity R is 2.0 or more ($R\geq2.0$) in a sample, the sample is determined to have antibacterial property.

In Example 2, the antibacterial activity R was 4.3 in the antibacterial test 1, which is shown in upper-left portion of Table 4, was 5.6 in the antibacterial test 2, which is shown in upper-right portion of Table 4, was 4.3 in the antibacterial test 3, which is shown in lower-left portion of Table 4, and was 6.2 in the antibacterial test 4, which is shown in lower-right portion of Table 4.

Accordingly, the antibacterial property was confirmed in Example 2.

The plastic lens 1 shown in FIG. 1 for spectacles according to each of Examples 7 to 9 and Comparative example 7 was produced. The physical film thickness and the like of each of the layers of these plastic lenses are indicated below in Table 5.

TABLE 5

| | Material | Refractive index at 500 nm | Physical film thickness [nm] Example 7 | Example 8 | Example 9 | Comparative example 7 |
|---|---|---|---|---|---|---|
| Base side | | | | | | |
| First layer | $SiO_2$ | 1.470 | 32.00 | 32.00 | 32.00 | 32.00 |
| Second layer | $ZrO_2$ | 2.106 | 37.00 | 37.00 | 37.00 | 37.00 |
| Third layer | $SiO_2$ | 1.470 | 24.00 | 24.00 | 24.00 | 24.00 |
| Fourth layer | $ZrO_2$ | 2.106 | 51.00 | 51.00 | 51.00 | 51.00 |
| Fifth layer | $SiO_2$ | 1.470 | 79.00 | 64.00 | 44.10 | 34.00 |
| Sixth layer | Sintered body B | 1.472 | 15.00 | 30.00 | 49.90 | 60.00 |
| Seventh layer | Antifouling layer | 1.350 | 5.00 | 5.00 | 5.00 | 5.00 |
| Air side | | | | | | |
| Constant temperature and humidity test 60° C.-95% RH | | One-day | no problem | no problem | no problem | no problem |
| | | Three-days | no problem | no problem | no problem | center portion was blistered |
| | | Five-days | no problem | no problem | no problem | center portion was blistered |
| | | Evaluation | excellent | excellent | excellent | poor |

The base 2 and the intermediate film 3 of each of Examples 7 to 9 and Comparative example 7 had the same structures as those of each of Examples 1 to 3 and Comparative examples 1 to 3.

In each of Examples 7 to 9 and Comparative example 7, the dielectric multilayer film 4 was an antireflection film. In each of Examples 7 to 9 and Comparative example 7, the dielectric multilayer films 4 having the same structure were provided on the front and the rear surfaces of the base 2.

The low refractive index dielectric layer 6 and the high refractive index dielectric layer 8 of each of Examples 7 to 9 and Comparative example 7 had the same structures as those of each of Examples 1 to 3 and Comparative examples 1 to 3.

The antifouling layer 12 of each of Examples 7 to 9 and Comparative example 7 had the same structure as that of each of Examples 1 to 3 and Comparative examples 1 to 3.

The antibacterial layer 10 of each of Examples 7 to 9 and Comparative example 7 was formed through deposition by using, as a deposition material, a sintered body obtained by collectively sintering silver ion-carrying zeolite and $SiO_2$. A weight ratio between the components in the sintered body satisfied silver ion-carrying zeolite:$SiO_2$=2:8. That is, a proportion of the added silver ion-carrying zeolite in the sintered body was 20% by weight. Hereinafter, such a sintered body is referred to as sintered body B. Each of the antibacterial layers 10 formed from the sintered body B had a refractive index of 1.472.

The antibacterial layer 10 of Example 7 had a physical film thickness of 15.00 nm. The antibacterial layer 10 of Example 8 had a physical film thickness of 30.00 nm. The antibacterial layer 10 of Example 9 had a physical film thickness of 49.90 nm. The antibacterial layer 10 of Comparative example 7 had a physical film thickness of 60.00 nm.

From the viewpoint of similarity of the refractive index, each antibacterial layer 10 was optically identical to the low refractive index dielectric layer 6 at the fifth layer adjacent to the antibacterial layer 10. From the viewpoint of retaining similarity of antireflection characteristics, in each of Examples 7 to 9 and Comparative example 7, the sum of the physical film thickness of the antibacterial layer 10 and the physical film thickness of the low refractive index dielectric layer 6 at the fifth layer adjacent to the antibacterial layer 10 was 94.00 nm, which was the same among Examples 7 to 9 and Comparative example 7.

The low refractive index dielectric layer 6 at the fifth layer in Example 7 had a physical film thickness of 79.00 nm. The low refractive index dielectric layer 6 at the fifth layer in Example 8 had a physical film thickness of 64.00 nm. The low refractive index dielectric layer 6 at the fifth layer in Example 9 had a physical film thickness of 44.10 nm. The low refractive index dielectric layer 6 at the fifth layer in Comparative example 7 had a physical film thickness of 34.00 nm.

The plastic lens 1 shown in FIG. 1 for spectacles according to each of Examples 10 to 12 and Comparative example 8 was produced. The physical film thickness and the like of each of the layers of these plastic lenses are indicated below in Table 6.

TABLE 6

| | Material | Refractive index at 500 nm | Physical film thickness [nm] Example 10 | Example 11 | Example 12 | Comparative example 8 |
|---|---|---|---|---|---|---|
| Base side | | | | | | |
| First layer | $SiO_2$ | 1.470 | 32.00 | 32.00 | 32.00 | 32.00 |
| Second layer | $ZrO_2$ | 2.106 | 37.00 | 37.00 | 37.00 | 37.00 |
| Third layer | $SiO_2$ | 1.470 | 24.00 | 24.00 | 24.00 | 24.00 |
| Fourth layer | $ZrO_2$ | 2.106 | 51.00 | 51.00 | 51.00 | 51.00 |

TABLE 6-continued

| | Material | Refractive index at 500 nm | Physical film thickness [nm] Example 10 | Example 11 | Example 12 | Comparative example 8 |
|---|---|---|---|---|---|---|
| Fifth layer | $SiO_2$ | 1.470 | 79.00 | 64.00 | 44.10 | 34.00 |
| Sixth layer | Sintered body C | 1.483 | 15.00 | 30.00 | 49.90 | 60.00 |
| Seventh layer | Antifouling layer | 1.350 | 5.00 | 5.00 | 5.00 | 5.00 |
| Air side | | | | | | |
| Constant temperature and humidity test 60° C.-95% RH | | One-day | no problem | no problem | no problem | no problem |
| | | Three-days | no problem | no problem | no problem | center portion was blistered |
| | | Five-days | no problem | no problem | Center portion was blistered | blistered |
| | | Evaluation | excellent | excellent | good | poor |

The base 2 and the intermediate film 3 of each of Examples 10 to 12 and Comparative example 8 had the same structures as those of each of Examples 1 to 3 and Comparative examples 1 to 3.

In each of Examples 10 to 12 and Comparative example 8, the dielectric multilayer film 4 was an antireflection film. In each of Examples 10 to 12 and Comparative example 8, the dielectric multilayer films 4 having the same structure were provided on the front and the rear surfaces of the base 2.

The low refractive index dielectric layer 6 and the high refractive index dielectric layer 8 of each of Examples 10 to 12 and Comparative example 8 had the same structures as those of each of Examples 1 to 3 and Comparative examples 1 to 3.

The antifouling layer 12 of each of Examples 10 to 12 and Comparative example 8 had the same structure as that of each of Examples 1 to 3 and Comparative examples 1 to 3.

The antibacterial layer 10 of each of Examples 10 to 12 and Comparative example 8 was formed through deposition by using, as a deposition material, a sintered body obtained by collectively sintering Silver ion-carrying zeolite and $SiO_2$. The weight ratio between the components in the sintered body satisfied silver ion-carrying zeolite:$SiO_2$=4:6. That is, a proportion of the added silver ion-carrying zeolite in the sintered body was 40% by weight. Hereinafter, such a sintered body is referred to as sintered body C. Each antibacterial layer 10 formed from the sintered body C had a refractive index of 1.483.

The antibacterial layer 10 of Example 10 had a physical film thickness of 15.00 nm. The antibacterial layer 10 of Example 11 had a physical film thickness of 30.00 nm. The antibacterial layer 10 of Example 12 had a physical film thickness of 49.90 nm. The antibacterial layer 10 of Comparative example 8 had a physical film thickness of 60.00 nm.

From the viewpoint of similarity of the refractive index, each antibacterial layer 10 was optically identical to the low refractive index dielectric layer 6 at the fifth layer adjacent to the antibacterial layer 10. From the viewpoint of retaining similarity of antireflection characteristics, in each of Examples 10 to 12 and Comparative example 8, the sum of the physical film thickness of the antibacterial layer 10 and the physical film thickness of the low refractive index dielectric layer 6 at the fifth layer adjacent to the antibacterial layer 10 was 94.00 nm, which was the same among Examples 10 to 12 and Comparative example 8.

The low refractive index dielectric layer 6 at the fifth layer in Example 10 had a physical film thickness of 79.00 nm. The low refractive index dielectric layer 6 at the fifth layer in Example 11 had a physical film thickness of 64.00 nm. The low refractive index dielectric layer 6 at the fifth layer in Example 12 had a physical film thickness of 44.10 nm. The low refractive index dielectric layer 6 at the fifth layer in Comparative example 8 had a physical film thickness of 34.00 nm.

The plastic lens 1 shown in FIG. 1 for spectacles according to each of Examples 13 to 15 and Comparative example 9 was produced. The physical film thickness and the like of each of the layers of these plastic lenses are indicated below in Table 7.

TABLE 7

| | Material | Refractive index at 500 nm | Physical film thickness [nm] Example 13 | Example 14 | Example 15 | Comparative example 9 |
|---|---|---|---|---|---|---|
| Base side | | | | | | |
| First layer | $SiO_2$ | 1.470 | 32.00 | 32.00 | 32.00 | 32.00 |
| Second layer | $ZrO_2$ | 2.106 | 37.00 | 37.00 | 37.00 | 37.00 |
| Third layer | $SiO_2$ | 1.470 | 24.00 | 24.00 | 24.00 | 24.00 |
| Fourth layer | $ZrO_2$ | 2.106 | 51.00 | 51.00 | 51.00 | 51.00 |
| Fifth layer | $SiO_2$ | 1.470 | 79.00 | 64.00 | 44.10 | 34.00 |
| Sixth layer | Sintered body D | 1.510 | 15.00 | 30.00 | 49.90 | 60.00 |
| Seventh layer | Antifouling layer | 1.350 | 5.00 | 5.00 | 5.00 | 5.00 |

TABLE 7-continued

| Material | Refractive index at 500 nm | Physical film thickness [nm] Example 13 | Example 14 | Example 15 | Comparative example 9 |
|---|---|---|---|---|---|
| Air side | | | | | |
| Constant temperature and humidity test 60° C.-95% RH | One-day | no problem | no problem | no problem | no problem |
| | Three-days | no problem | no problem | no problem | center portion was blistered |
| | Five-days | no problem | no problem | center portion was blistered | blistered |
| | Evaluation | excellent | excellent | good | poor |

The base 2 and the intermediate film 3 of each of Examples 13 to 15 and Comparative example 9 had the same structures as those of each of Examples 1 to 3 and Comparative examples 1 to 3.

In each of Examples 13 to 15 and Comparative example 9, the dielectric multilayer film 4 was an antireflection film. In each of Examples 13 to 15 and Comparative example 9, the dielectric multilayer films 4 having the same structure were provided on the front and the rear surfaces of the base 2.

The low refractive index dielectric layer 6 and the high refractive index dielectric layer 8 of each of Examples 13 to 15 and Comparative example 9 had the same structures as those of each of Examples 1 to 3 and Comparative examples 1 to 3.

The antifouling layer 12 of each of Examples 13 to 15 and Comparative example 9 had the same structure as that of each of Examples 1 to 3 and comparative examples 1 to 3.

The antibacterial layer 10 of each of Examples 13 to 15 and Comparative example 9 was formed through deposition by using, as a deposition material, a sintered body obtained by collectively sintering silver ion-carrying zeolite and $SiO_2$. A weight ratio between the components in the sintered body satisfied silver ion-carrying zeolite:$SiO_2$=5:5. That is, a proportion of the added silver ion-carrying zeolite in the sintered body was 50% by weight. Hereinafter, such a sintered body is referred to as sintered body D. Each antibacterial layer 10 formed from the sintered body D had a refractive index of 1.510.

The antibacterial layer 10 of Example 13 had a physical film thickness of 15.00 nm. The antibacterial layer 10 of Example 14 had a physical film thickness of 30.00 nm. The antibacterial layer 10 of Example 15 had a physical film thickness of 49.90 nm. The antibacterial layer 10 of Comparative example 9 had a physical film thickness of 60.00 nm.

From the viewpoint of similarity of the refractive index, each antibacterial layer 10 was optically identical to the low refractive index dielectric layer 6 at the fifth layer adjacent to the antibacterial layer 10. From the viewpoint of retaining similarity of antireflection characteristics, in each of Examples 13 to 15 and Comparative example 9, the sum of the physical film thickness of the antibacterial layer 10 and the physical film thickness of the low refractive index dielectric layer 6 at the fifth layer adjacent to the antibacterial layer 10 was 94.00 nm, which was the same among Examples 13 to 15 and Comparative example 9.

The low refractive index dielectric layer 6 at the fifth layer in Example 13 had a physical film thickness of 79.00 nm. The low refractive index dielectric layer 6 at the fifth layer in Example 14 had a physical film thickness of 64.00 nm. The low refractive index dielectric layer 6 at the fifth layer in Example 15 had a physical film thickness of 44.10 nm. The low refractive index dielectric layer 6 at the fifth layer in Comparative example 9 had a physical film thickness of 34.00 nm.

In each of Examples 7 to 15 and Comparative Examples 7 to 9, a spectral reflectance distribution in a visible light range and a range adjacent thereto was examined. In the description herein, the visible light range is a range in which the wavelength is 400 nm or more and 780 nm or less.

Figure 8:
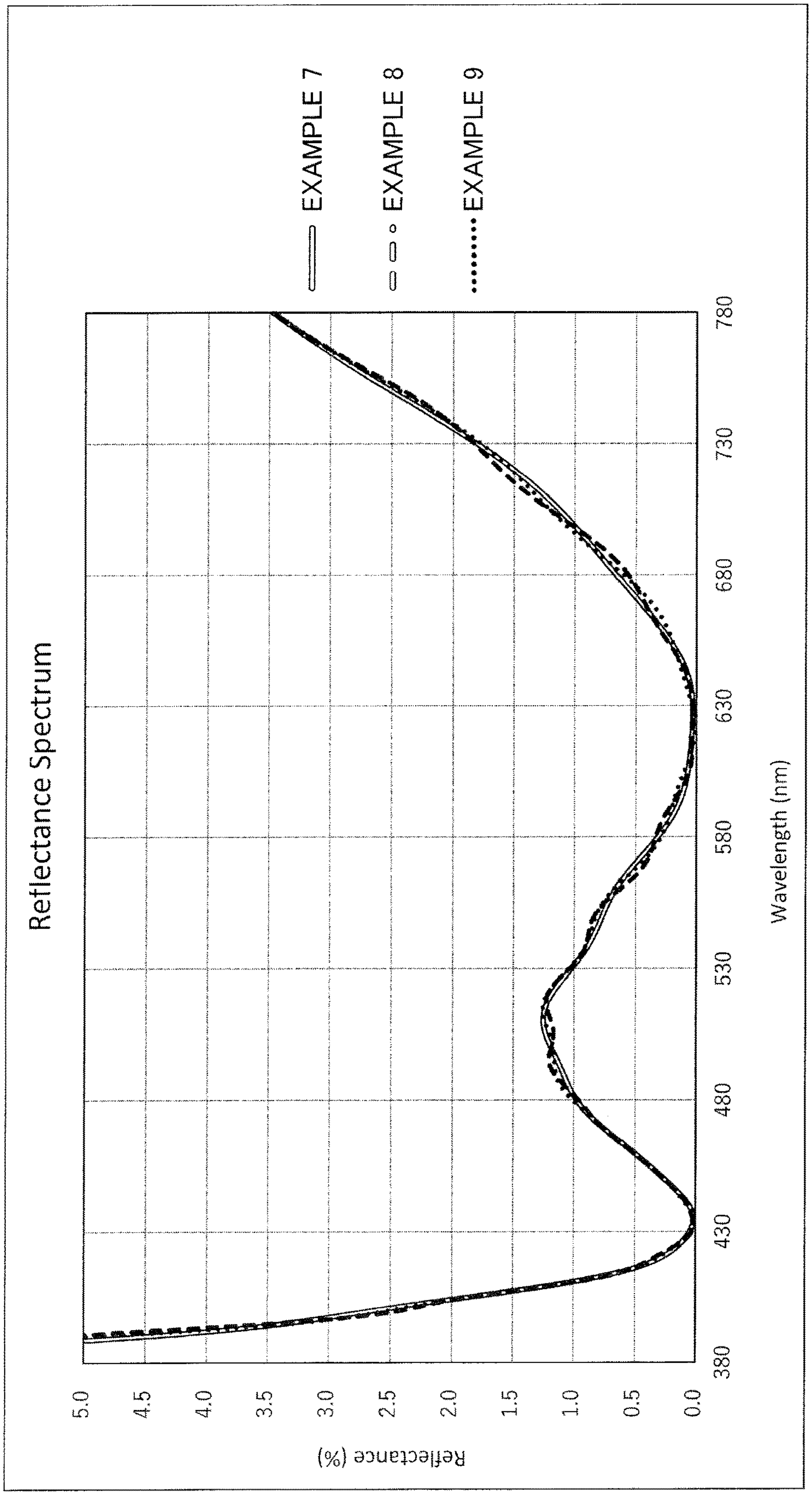
FIG. 8 shows a graph representing a spectral reflectance distribution in a visible light range and a range adjacent thereto, according to Examples 7 to 9.
Figure 9:
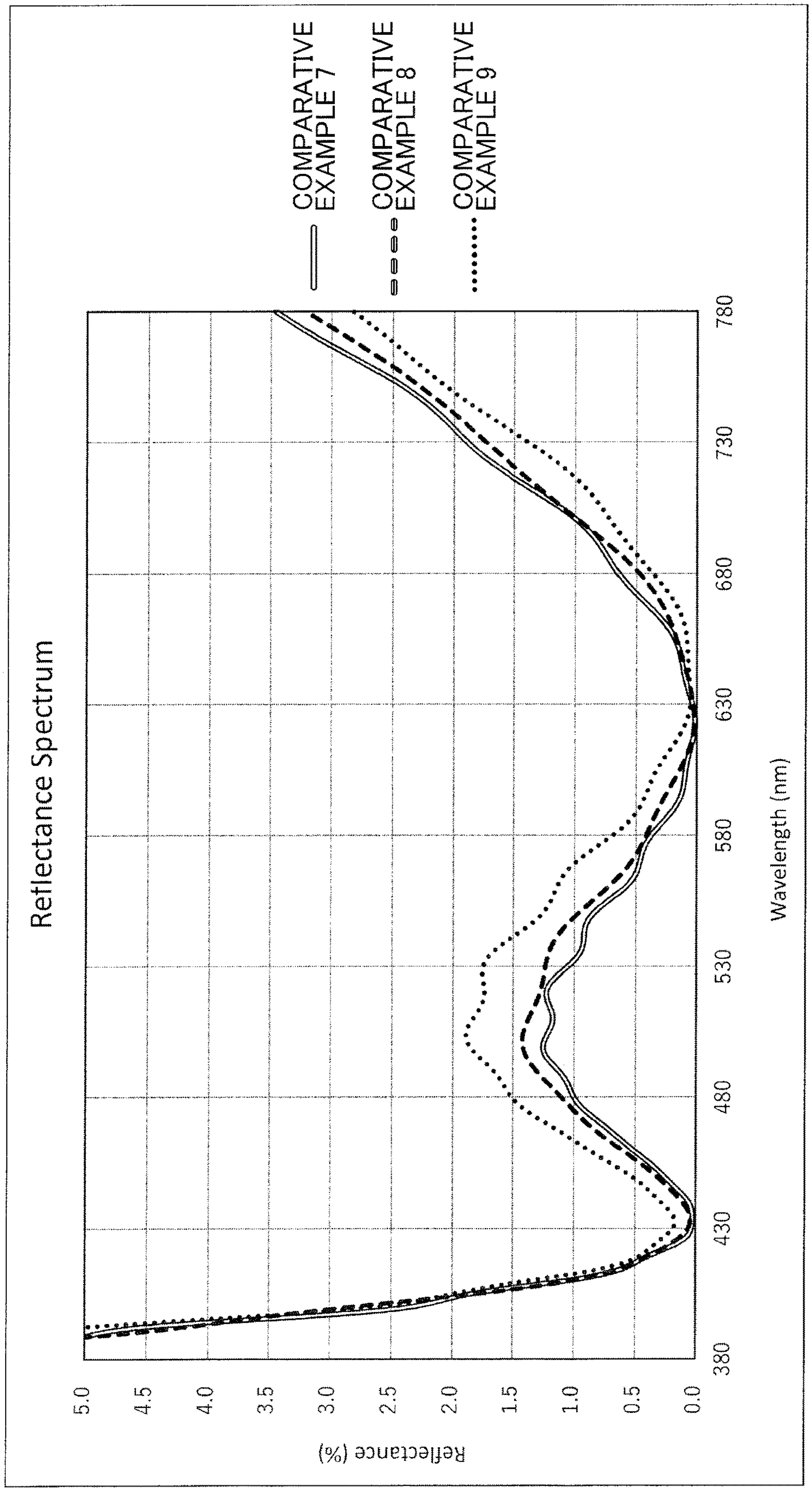
FIG. 9 shows a graph representing a spectral reflectance distribution in a visible light range and a range adjacent thereto, according to Comparative examples 7 to 9.
Figure 10:
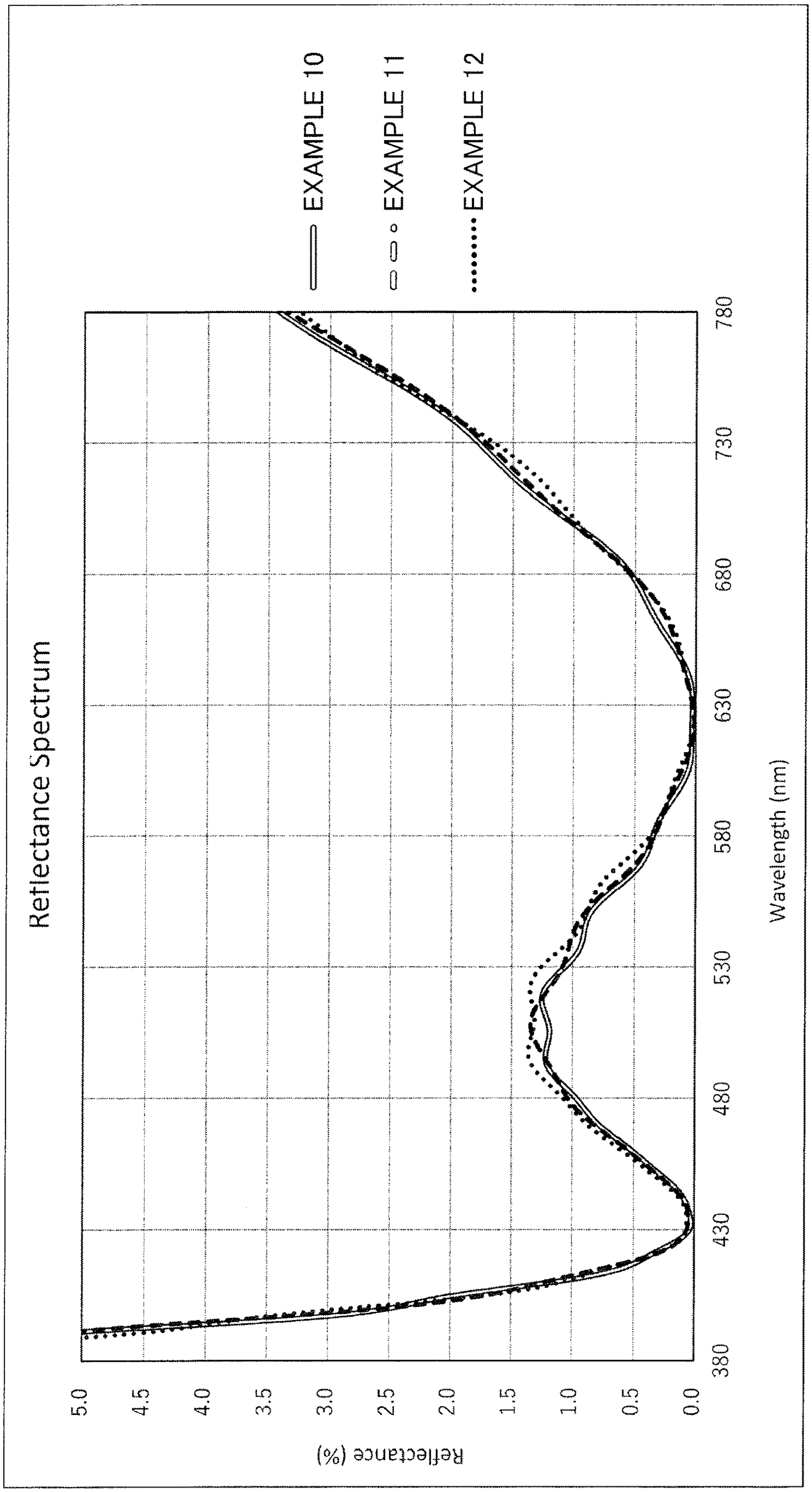
FIG. 10 shows a graph representing a spectral reflectance distribution in a visible light range and a range adjacent thereto, according to Examples 10 to 12.
Figure 11:
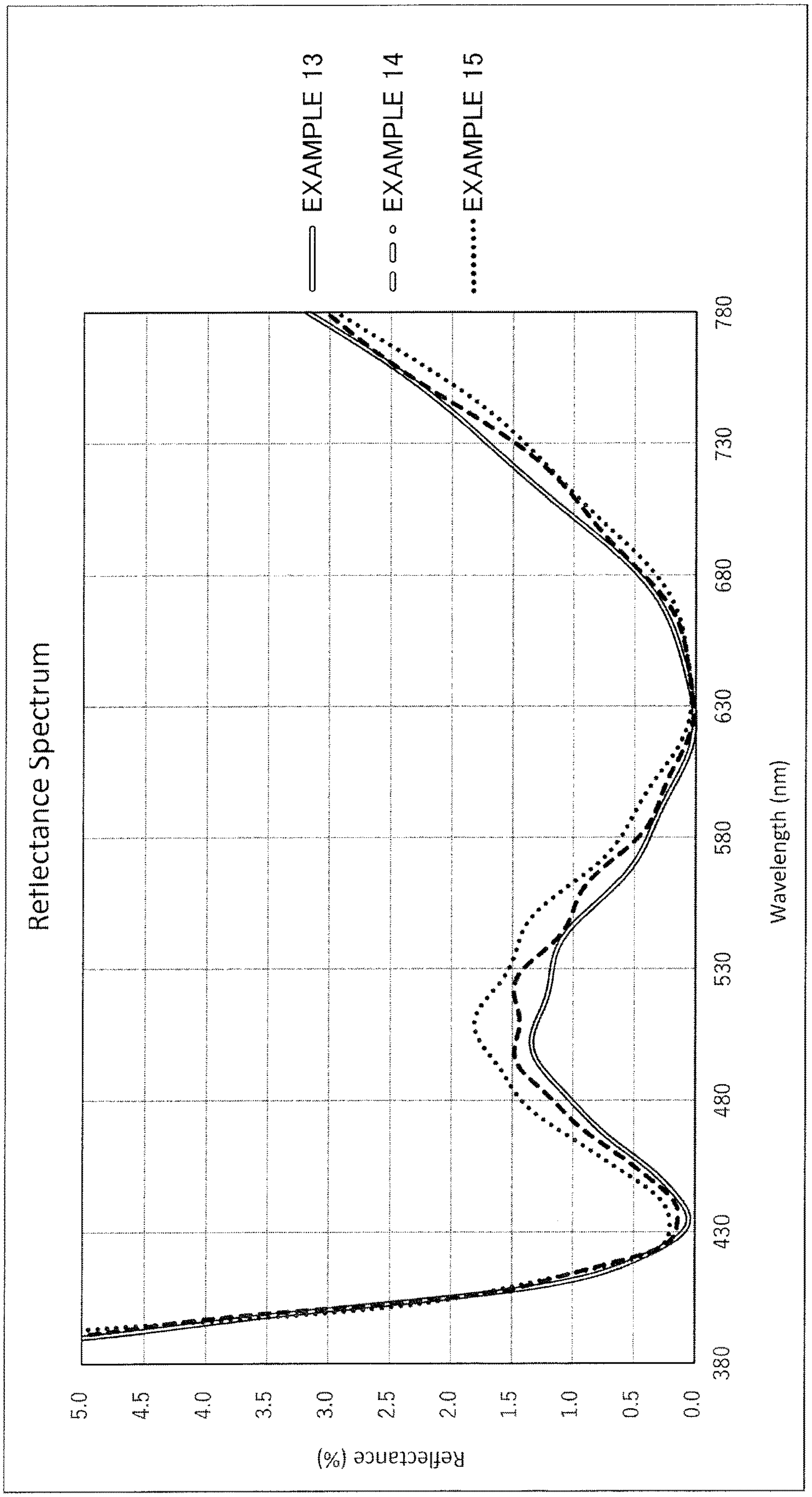
FIG. 11 shows a graph representing a spectral reflectance distribution in a visible light range and a range adjacent thereto, according to Examples 13 to 15.

FIG. 8 shows a graph representing a spectral reflectance distribution in a visible light range and a range adjacent thereto, according to Examples 7 to 9. FIG. 9 shows a graph representing a spectral reflectance distribution in a visible light range and a range adjacent thereto, according to Comparative examples 7 to 9. FIG. 10 shows a graph representing a spectral reflectance distribution in a visible light range and a range adjacent thereto, according to Examples 10 to 12. FIG. 11 shows a graph representing a spectral reflectance distribution in a visible light range and a range adjacent thereto, according to Examples 13 to 15.

According to these figures, in each of Examples 7 to 15 and Comparative Examples 7 to 9, antireflection characteristics were observed in the visible light range.

The above described constant temperature and humidity test was performed in order to examine durability also for each of Examples 7 to 15 and Comparative Examples 7 to 9.

In the lower portions in Table 5 to Table 7, the results of the constant temperature and humidity test are indicated.

In the one-day constant temperature and humidity test, a problem with abnormal outer appearance or the like was not observed in any of the samples. In the three-day constant temperature and humidity test, blister occurring at the center portion of the plastic lens 1 for spectacles was observed in Comparative Examples 7 to 9 (Evaluation "poor"). In the five-day constant temperature and humidity test, blister occurring at the center portion of the plastic lens 1 for spectacles was observed in Comparative example 7, and, in each of Comparative examples 8 and 9, occurrence of blister was observed over the entirety of the plastic lens 1 for spectacles. Furthermore, in the five-day constant temperature and humidity test, blister occurring at the center portion of the plastic lens 1 for spectacles was observed in each of Examples 12 and 15. Thus, in a case where no problem was observed in the three-day constant temperature and humidity test, and blister was observed at the center portion for the first time in the five-day constant temperature and humidity test, the evaluation was "good".

In each of Comparative Examples 7 to 9, it is considered that the antibacterial layer 10 had a physical film thickness of 60 nm, and water vapor barrier property of the antibacterial layer 10 was at a predetermined or higher level, and thus, the water content was not released well from the base 2, leading to abnormal outer appearance in which blisters occurred.

In each of Examples 7 to 11, 13, and 14, in the one-day, the three-day, and the five-day constant temperature and humidity tests, abnormal outer appearance was not observed (Evaluation “excellent”).

Furthermore, for each of Examples 7 to 15, an antibacterial test in accordance with ISO22196 was performed. In order to more quickly obtain results for a relatively large number of samples, the above-described antibacterial test 1 (*Staphylococcus aureus*) and antibacterial test 2 (*Escherichia coli*) were performed so as to obtain the number of digits of the viable cell count after 24 hours from the inoculation (simple antibacterial tests 1 and 2). The simple antibacterial tests 1 and 2 were performed also for each of Comparative example 1 and Examples 1 to 3. In the simple antibacterial tests 1 and 2 for Comparative example 1, the number of digits of the initial cell count was also measured.

The results of such bacterial tests are indicated below in Table 8.

TABLE 8

| | Sintered body | Amount of added Ag-carrying zeolite (wt %) | Physical film thickness (nm) | *Staphylococcus aureus* Initial cell count | *Staphylococcus aureus* Cell count after 24 hours | *Staphylococcus aureus* Antibacterial property | *Escherichia coli* Initial cell count | *Escherichia coli* Cell count after 24 hours | *Escherichia coli* Antibacterial property |
|---|---|---|---|---|---|---|---|---|---|
| Comparative example 1 | — | — | — | 10E4 | 10E4 | poor | 10E4 | 10E6 | poor |
| Example 1 | Sintered body A | 30 | 15.00 | — | ND | good | — | ND | good |
| Example 2 | | | 30.00 | — | ND | good | — | ND | good |
| Example 3 | | | 49.90 | — | ND | good | — | ND | good |
| Example 7 | Sintered body B | 20 | 15.00 | — | ND | good | — | ND | good |
| Example 8 | | | 30.00 | — | ND | good | — | ND | good |
| Example 9 | | | 49.90 | — | ND | good | — | ND | good |
| Example 10 | Sintered body C | 40 | 15.00 | — | ND | good | — | ND | good |
| Example 11 | | | 30.00 | — | ND | good | — | ND | good |
| Example 12 | | | 49.90 | — | ND | good | — | ND | good |
| Example 13 | Sintered body D | 50 | 15.00 | — | ND | good | — | ND | good |
| Example 14 | | | 30.00 | — | ND | good | — | ND | good |
| Example 15 | | | 49.90 | — | ND | good | — | ND | good |

The number of digits of the initial cell count in Comparative example 1 (did not include the antibacterial layer 10) was 5 (about $1\times10^4$, 10E4) in the simple antibacterial tests 1 and 2. The number of digits of the cell count obtained after 24 hours in Comparative example 1 was 5 (10E4) in the simple antibacterial test 1, and was 7 (10E6) in the simple antibacterial test 2 (antibacterial property was “poor” in each test).

Meanwhile, in each of Examples 1 to 3 and 7 to 15, the cell count obtained after 24 hours indicated the detection limit or less (ND) in the simple antibacterial tests 1 and 2 (antibacterial property was “good”). The detection limit was the cell count (10E1) for which the number of digits was two. By referring to such results and the above-described results of Comparative example 1, the antibacterial activity R in each of Examples 1 to 3 and 7 to 15 was estimated to be sufficiently greater than 2.0. In the simple antibacterial tests 1 and 2 for each of Examples 1 to 3 and 7 to 15, although the initial cell count was not measured, since the test bacterial solution was the same as that of Comparative example 1, the initial cell count was the same as that of Comparative example 1.

Accordingly, the antibacterial property was confirmed in each of Examples 1 to 3 and 7 to 15.

In each of Examples 1 to 15, the plastic base 2, and the dielectric multilayer film 4 formed indirectly on the film formation surface M of the base 2 are provided. The dielectric multilayer film 4 includes one or more low refractive index dielectric layers 6, one or more high refractive index dielectric layers 8, and the antibacterial layer 10. The antibacterial layer 10 is a dielectric layer containing metal ion-carrying zeolite, and is disposed closer to an air side than all of the low refractive index dielectric layers 6 and all of the high refractive index dielectric layers 8 are. The antibacterial layer 10 has a physical film thickness of less than 50 nm. Therefore, the plastic lens 1, for spectacles, which inhibits occurrence of abnormal outer appearance and has antibacterial property, is provided.

In each of Examples 1 to 15, the metal ion-carrying zeolite is silver ion-carrying zeolite. Therefore, the plastic lens 1, for spectacles, which has higher antibacterial effect and durability is provided.

In each of Examples 1 to 15, the antibacterial layer 10 contains $SiO_2$. Therefore, the metal particles 14 become more stable in the antibacterial layer 10. Furthermore, the antibacterial layer 10 can be handled optically as a layer that is the same as an $SiO_2$ layer, and ease of design is enhanced in the dielectric multilayer film 4.

In each of Examples 1 to 15, the antibacterial layer 10 is formed by a sintered body obtained by collectively sintering metal ion-carrying zeolite and $SiO_2$. Therefore, the antibacterial layer 10 containing the metal particles 14 can be more easily formed.

In each of Examples 1 to 15, the dielectric multilayer films 4 are formed on both surfaces of the base 2. Therefore, the plastic lens 1, for spectacles, having more excellent antibacterial property is provided.

In each of Examples 1 to 15, the dielectric multilayer film 4 is formed via the intermediate film 3 as the hard coating film. Therefore, the plastic lens 1, for spectacles, having more excellent strength is provided.

In addition, in each of Examples 1 to 15, the dielectric multilayer film 4 includes the antifouling layer 12 having water-repellency and oil-repellency. The antifouling layer 12 is disposed closer to the air side than the antibacterial layer 10 is. Therefore, in the plastic lens 1 for spectacles, antifouling performance can be exhibited without hindering antibacterial property of the antibacterial layer 10.

In each of Examples 1 to 15, the antifouling layer 12 is a fluorine-containing organosilicon compound. Therefore, the antifouling layer 12 can be more easily formed.

The invention claimed is:

1. A plastic lens for spectacles, the plastic lens comprising:

a plastic base; and a dielectric multilayer film formed directly or indirectly on a film formation surface of the base, wherein the dielectric multilayer film includes one or more low refractive index dielectric layers, one or more high refractive index dielectric layers, and an antibacterial layer, the antibacterial layer is a dielectric layer containing metal ion-carrying zeolite and $SiO_2$, and is disposed closer to an air side than all of the low refractive index dielectric layers and all of the high refractive index dielectric layers are, the antibacterial layer is formed from a sintered body obtained by collectively sintering the metal ion-carrying zeolite and the $SiO_2$, and a physical film thickness of the antibacterial layer is less than 50 nm.

2. The plastic lens for spectacles according to claim 1, wherein the metal ion-carrying zeolite is silver ion-carrying zeolite.

3. The plastic lens for spectacles according to claim 1, wherein the dielectric multilayer film is formed on each of both surfaces of the base.

4. The plastic lens for spectacles according to claim 1, wherein the dielectric multilayer film is formed via a hard coating film.

5. The plastic lens for spectacles according to claim 1, wherein the dielectric multilayer film includes an antifouling layer exhibiting at least one of water-repellency and oil-repellency, and the antifouling layer is disposed closer to the air side than the antibacterial layer is.

6. The plastic lens for spectacles according to claim 5, wherein the antifouling layer is a fluorine-containing organosilicon compound.

* * * * *